(12) United States Patent
Rahman et al.

(10) Patent No.: US 12,028,815 B2
(45) Date of Patent: *Jul. 2, 2024

(54) CAPABILITY SIGNALING TO ENABLE FULL POWER UPLINK TRANSMISSION

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,037

(22) Filed: May 8, 2023

(65) Prior Publication Data

US 2024/0007967 A1    Jan. 4, 2024

Related U.S. Application Data

(63) Continuation of application No. 17/325,126, filed on May 19, 2021, now Pat. No. 11,647,467.

(60) Provisional application No. 63/065,238, filed on Aug. 13, 2020, provisional application No. 63/060,468, filed on Aug. 3, 2020, provisional application No. (Continued)

(51) Int. Cl.
*H04W 52/30* (2009.01)
*H04W 52/38* (2009.01)

(52) U.S. Cl.
CPC .......... *H04W 52/30* (2013.01); *H04W 52/38* (2013.01)

(58) Field of Classification Search
CPC .. H04B 7/0456; H04B 7/0404; H04B 7/0621; H04B 17/364; H04B 7/0671; H04B 7/0465; H04B 7/0691; H04B 7/061; H04B 7/0634; H04B 7/0469; H04B 7/043; H04B 7/063; H04B 1/713; H04W 72/1268; H04W 76/27; H04W 8/24; H04W 72/14; H04W 80/02; H04L 1/1819
See application file for complete search history.

(56) References Cited

U.S. PATENT DOCUMENTS 11,101,856 B2 * 8/2021 Park ..................... H04B 7/0486
11,159,221 B2 * 10/2021 Manolakos .......... H04B 7/0691
(Continued)

OTHER PUBLICATIONS

Extended European Search Report dated Sep. 1, 2023 regarding Application No. 21814296.6, 8 pages.
(Continued)

*Primary Examiner* — Jung Liu

(57) ABSTRACT

A method for operating a user equipment (UE) comprises transmitting UE capability information including a full power transmission capability, wherein the full power transmission capability includes information (I) to indicate multiple transmit precoding matrix indicator (TPMI) groups that deliver full power; receiving configuration information for a physical uplink shared channel (PUSCH) transmission; receiving a TPMI indicating a precoding matrix and a number of layers for the PUSCH transmission; determining the PUSCH transmission based on the configuration information; determining a power level for the PUSCH transmission, wherein the power level corresponds to full power if the TPMI is included in one of the multiple TPMI groups that deliver full power; and transmitting the PUSCH transmission with the determined power level.

20 Claims, 11 Drawing Sheets

Related U.S. Application Data

63/040,137, filed on Jun. 17, 2020, provisional application No. 63/035,459, filed on Jun. 5, 2020, provisional application No. 63/031,384, filed on May 28, 2020.

(56) References Cited

U.S. PATENT DOCUMENTS

| | | | | |
|---|---|---|---|---|
| 11,206,618 | B2* | 12/2021 | Huang | H04L 5/0051 |
| 11,228,984 | B2* | 1/2022 | Harrison | H04B 7/0404 |
| 11,303,339 | B2* | 4/2022 | Park | H04L 1/0681 |
| 2020/0044706 | A1* | 2/2020 | Wernersson | H04W 72/0473 |
| 2020/0154364 | A1 | 5/2020 | Rahman | |
| 2020/0267661 | A1* | 8/2020 | Park | H04W 76/27 |
| 2020/0267701 | A1* | 8/2020 | Park | H04W 72/23 |
| 2020/0322026 | A1* | 10/2020 | Manolakos | H04W 76/27 |
| 2020/0382180 | A1* | 12/2020 | Wang | H04B 7/0482 |
| 2020/0383062 | A1* | 12/2020 | Wang | H04L 25/0226 |
| 2021/0352596 | A1* | 11/2021 | Liu | H04W 52/367 |
| 2021/0359734 | A1* | 11/2021 | Park | H04B 7/088 |
| 2021/0399773 | A1* | 12/2021 | Huang | H04B 17/364 |
| 2022/0015039 | A1* | 1/2022 | Huang | H04B 7/0456 |
| 2022/0124631 | A1* | 4/2022 | Harrison | H04W 52/367 |

OTHER PUBLICATIONS

Moderator (VIVO), "Feature lead summary of [100b-e-NR-eMIMO-ULFPTx-03] Email discussion", 3GPP TSG RAN WG1 #100bis, R1-2002980, Apr. 2020, 8 pages.

VIVO, "Feature lead summary on Full TX Power UL transmission", 3GPP TSG RAN WG1#96, R1-1903410, Feb. 2019, 19 pages.

International Search Report and Written Opinion of the International Searching Authority dated Sep. 1, 2021, in connection with International Application No. PCT/KR2021/006688, 10 pages.

Catt, "On UL full power transmission," R1-2003629, 3GPP TSG RAN WG1 Meeting #101, e-Meeting, May 25-Jun. 5, 2020, 12 pages.

Nokia, et al., "Remaining issues on Full Tx power UL transmission," R1-2002296, 3GPP TSG RAN WG1 Meeting #100bis, e-Meeting, Apr. 20-30, 2020, 6 pages.

NTT Docomo, Inc., "Remaining issues on full Tx power UL transmission," R1-2004397, 3GPP TSG RAN WG1 Meeting #101, e-Meeting, May 25-Jun. 5, 2020, 15 pages.

Vivo, "Feature lead summary on Full TX Power UL transmission," R1-1912042, 3GPP TSG RAN WG1 Meeting #99, Reno, USA, Nov. 18-22, 2019, 27 pages.

"3rd Generation Partnership Project; Technical Specification Group Radio Access Network; Evolved Universal Terrestrial Radio Access (E-UTRA); Physical channels and modulation (Release 16)", 3GPP TS 36.211 V16.5.0, Mar. 2021, 249 pages.

"LTE; Evolved Universal Terrestrial Radio Access (E-UTRA); Multiplexing and channel coding, 3GPP TS 36.212 V16.5.0 (Release 16)", ETSI TS 136 212 V16.5.0, Apr. 2021, 259 pages.

"3rd Generation Partnership Project; Technical Specification Group Radio Access Network; Evolved Universal Terrestrial Radio Access (E-UTRA); Physical layer procedures (Release 16)", 3GPP TS 36.213 V16.5.0, Mar. 2021, 577 pages.

"LTE; Evolved Universal Terrestrial Radio Access (E-UTRA); Medium Access Control (MAC) protocol specification (3GPP TS 36.321 version 16.4.0 Release 16)", ETSI TS 136 321 V16.4.0, Apr. 2021, 144 pages.

"LTE; Evolved Universal Terrestrial Radio Access (E-UTRA); Radio Resource Control (RRC); Protocol specification (3GPP TS 36.331 version 16.4.0 Release 16)", ETSI TS 136 331 V16.4 0, Apr. 2021, 1093 pages.

"5G; NR; Physical channels and modulation (3GPP TS 38.211 version 16.5.0, Release 16)", ETSI TS 138 211 V16.5.0, Apr. 2021, 138 pages.

"5G; NR; Multiplexing and channel coding (3GPP TS 38.212 version 16.5.0 Release 16)", ETSI TS 138 212 V16.5.0, Apr. 2021, 155 pages.

"3rd Generation Partnership Project; Technical Specification Group Radio Access Network; NR; Physical layer procedures for control (Release 16)", 3GPP TS 38.213 V16.4.0, Dec. 2020, 181 pages.

"3rd Generation Partnership Project; Technical Specification Group Radio Access Network; NR; Physical layer procedures for data (Release 16)", 3GPP TS 38.214 V16.4.0, Dec. 2020, 169 pages.

"5G; NR; Physical layer measurements (3GPP TS 38.215 version 16.4.0 Release 16)", ETSI TS 138 215 V16.4.0, Jan. 2021, 31 pages.

"5G; NR; Medium Access Control (MAC) protocol specification (3GPP TS 38.321 version 16.4.0 Release 16)", ETSI TS 138 321 V16.4.0, Apr. 2021, 159 pages.

"5G; NR; Radio Resource Control (RRC); Protocol specification (3GPP TS 38.331 version 16.4.1 Release 16)", ETSI TS 138 331 V16.4.1, Apr. 2021, 932 pages.

\* cited by examiner

CAPABILITY SIGNALING TO ENABLE FULL POWER UPLINK TRANSMISSION

CROSS-REFERENCE TO RELATED APPLICATIONS AND CLAIM OF PRIORITY

This application is a continuation of U.S. patent application Ser. No. 17/325,126, filed on May 19, 2021, which claims priority to U.S. Provisional Patent Application No. 63/031,384, filed on May 28, 2020, U.S. Provisional Patent Application No. 63/035,459 filed on Jun. 5, 2020, U.S. Provisional Patent Application No. 63/040,137, filed on Jun. 17, 2020, U.S. Provisional Patent Application No. 63/060,468, filed on Aug. 3, 2020, and U.S. Provisional Patent Application No. 63/065,238 filed on Aug. 13, 2020. The content of the above-identified patent documents is incorporated herein by reference.

TECHNICAL FIELD

The present disclosure relates generally to wireless communication systems and more specifically to capability signaling to enable full power uplink transmission.

BACKGROUND

Understanding and correctly estimating the UL channel between a user equipment (UE) and a gNode B (gNB) is important for efficient and effective wireless communication. In order to correctly estimate the UL channel conditions, the UE may transmit reference signal, e.g., SRS, to the gNB for UL channel measurement. With this UL channel measurement, the gNB is able to select appropriate communication parameters to efficiently and effectively perform wireless data communication with the UE in the UL.

SUMMARY

Embodiments of the present disclosure provide methods and apparatuses for full power UL MIMO operation in a wireless communication system.

In one embodiment, a UE in a wireless communication system is provided. The UE includes a transceiver configured to: transmit UE capability information including a full power transmission capability, wherein the full power transmission capability includes information (I) to indicate multiple transmit precoding matrix indicator (TPMI) groups that deliver full power; receive configuration information for a physical uplink shared channel (PUSCH) transmission; and receive a TPMI indicating a precoding matrix and a number of layers for the PUSCH transmission. The UE further includes a processor operably coupled to the transceiver. The processor is configured to determine the PUSCH transmission based on the configuration information; and determine a power level for the PUSCH transmission, wherein the power level corresponds to full power if the TPMI is included in one of the multiple TPMI groups that deliver full power. The transceiver is further configured to transmit the PUSCH transmission with the determined power level.

In another embodiment, a BS in a wireless communication system is provided. The BS includes a transceiver configured to receive user equipment (UE) capability information including a full power transmission capability, wherein the full power transmission capability includes information (I) to indicate multiple transmit precoding matrix indicator (TPMI) groups that deliver full power. The BS further includes a processor operably connected to the transceiver. The processor is configured to: generate configuration information for a physical uplink shared channel (PUSCH) transmission, and generate a TPMI indicating a precoding matrix and a number of layers for the PUSCH transmission. The transceiver is further configured to: transmit the configuration information for the PUSCH transmission, transmit the TPMI; and receive the PUSCH transmission, the PUSCH transmission transmitted with a power level, wherein the power level corresponds to full power if the TPMI is included in one of the multiple TPMI groups that deliver full power.

In yet another embodiment, a method for operating a UE is provided. The method comprises: transmitting UE capability information including a full power transmission capability, wherein the full power transmission capability includes information (I) to indicate multiple transmit precoding matrix indicator (TPMI) groups that deliver full power; receiving configuration information for a physical uplink shared channel (PUSCH) transmission; receiving a TPMI indicating a precoding matrix and a number of layers for the PUSCH transmission; determining the PUSCH transmission based on the configuration information; determining a power level for the PUSCH transmission, wherein the power level corresponds to full power if the TPMI is included in one of the multiple TPMI groups that deliver full power; and transmitting the PUSCH transmission with the determined power level.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
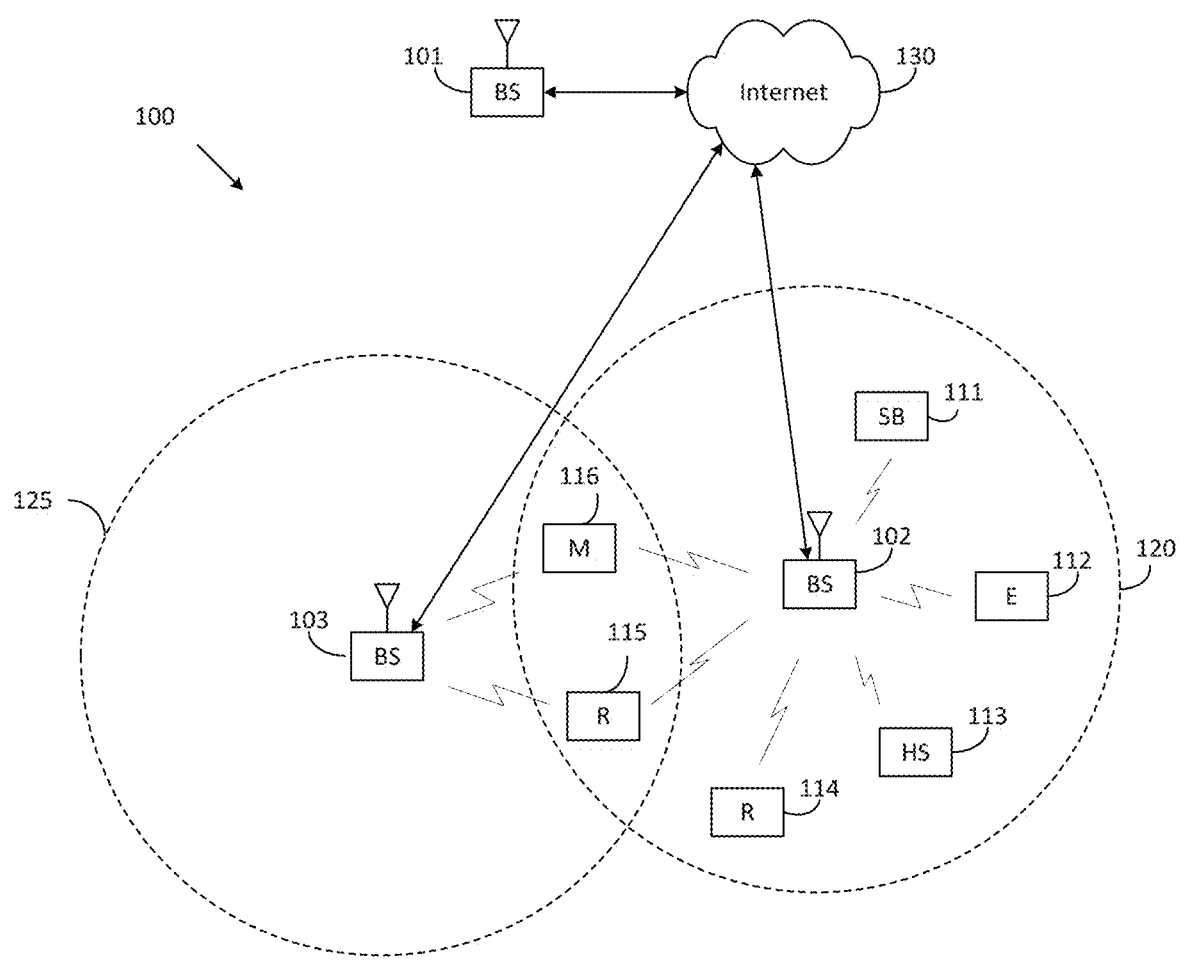
FIG. 1 illustrates an example wireless network according to embodiments of the present disclosure.

FIG. 1 through FIG. 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.5.0, "E-UTRA, Physical channels and modulation" (herein "REF 1"); 3GPP TS 36.212 v16.5.0, "E-UTRA, Multiplexing and Channel coding" (herein "REF 2"); 3GPP TS 36.213 v16.5.0, "E-UTRA, Physical Layer Procedures" (herein "REF 3"); 3GPP TS 36.321 v16.4.0, "E-UTRA, Medium Access Control (MAC) protocol specification" (herein "REF 4"); 3GPP TS 36.331 v16.4.0, "E-UTRA, Radio Resource Control (RRC) protocol specification" (herein "REF 5"); 3GPP TS 38.211 v16.5.0, "NR, Physical channels and modulation" (herein "REF 6"); 3GPP TS 38.212 v16.5.0, "NR, Multiplexing and Channel coding" (herein "REF 7"); 3GPP TS 38.213 v16.4.0, "NR, Physical Layer Procedures for Control" (herein "REF 8"); 3GPP TS 38.214 v16.4.0, "NR, Physical Layer Procedures for Data" (herein "REF 9"); 3GPP TS 38.215 v16.4.0, "NR, Physical Layer Measurements" (herein "REF 10"); 3GPP TS 38.321 v16.4.0, "NR, Medium Access Control (MAC) protocol specification" (herein "REF 11"); and 3GPP TS 38.331 v16.4.1, "NR, Radio Resource Control (RRC) Protocol Specification" (herein "REF 12").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
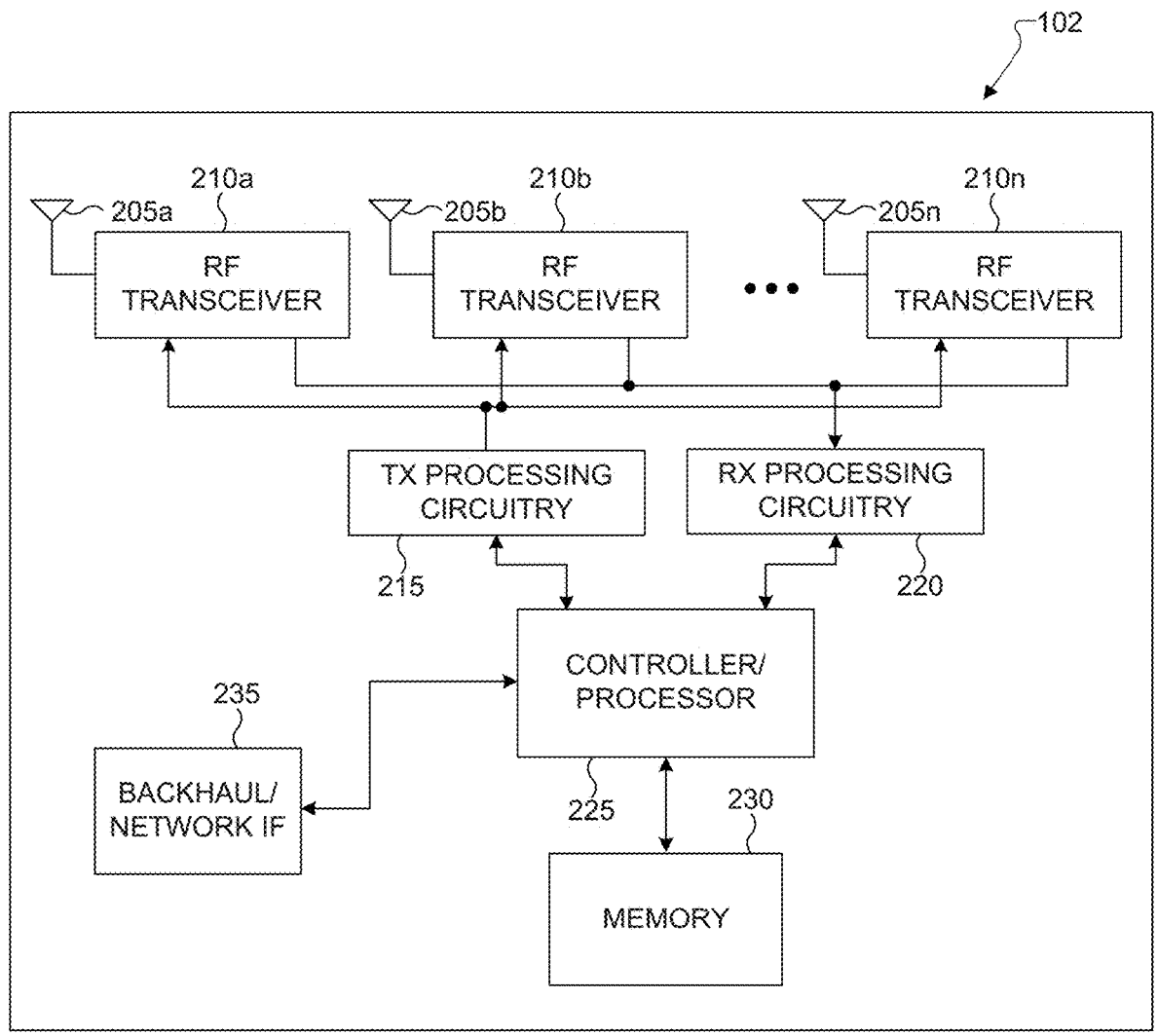
FIG. 2 illustrates an example gNB according to embodiments of the present disclosure.
Figure 3:
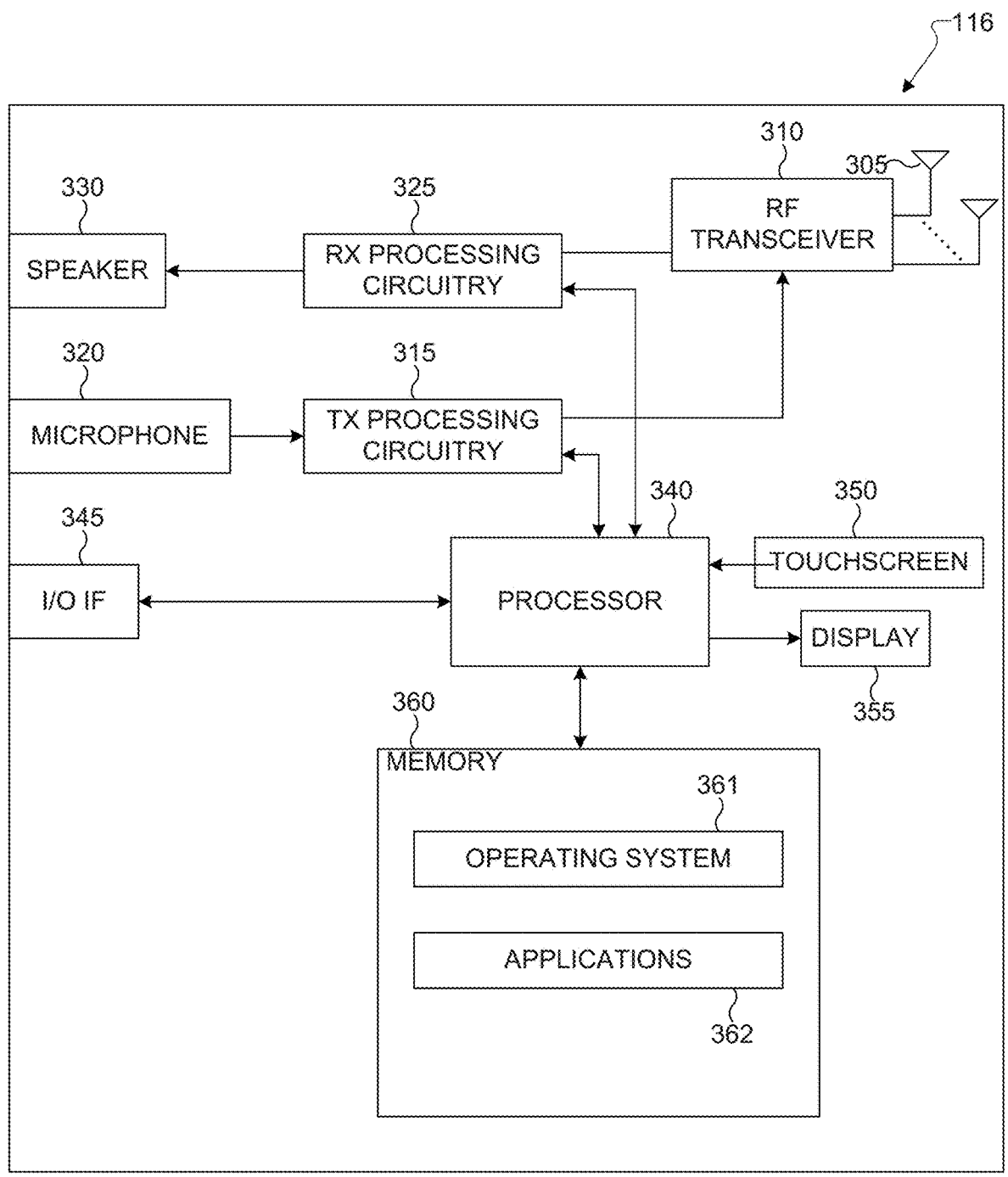
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (E); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for transmitting UE capability information including a full power transmission capability, wherein the full power transmission capability includes information (I) to indicate multiple transmit precoding matrix indicator (TPMI) groups that deliver full power; receiving configuration information for a physical uplink shared channel (PUSCH) transmission; receiving a TPMI indicating a precoding matrix and a number of layers for the PUSCH transmission; determining the PUSCH transmission based on the configuration information; determining a power level for the PUSCH transmission, wherein the power level corresponds to full power if the TPMI is included in one of the multiple TPMI groups that deliver full power; and transmitting the PUSCH transmission with the determined power level. One or more of the gNBs 101-103 includes circuitry, programing, or a combination thereof, for receiving user equipment (UE) capability information including a full power transmission capability, wherein the full power transmission capability includes information (I) to indicate multiple transmit precoding matrix indicator (TPMI) groups that deliver full power; generating configuration information for a physical uplink shared channel (PUSCH) transmission; generating a TPMI indicating a precoding matrix and a number of layers for the PUSCH transmission; transmitting the configuration information for the PUSCH transmission; transmitting the TPMI; and receiving the PUSCH transmission, the PUSCH transmission transmitted with a power level, wherein the power level corresponds to full power if the TPMI is included in one of the multiple TPMI groups that deliver full power.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for transmitting UE capability information including a full power transmission capability, wherein the full power transmission capability includes information (I) to indicate multiple transmit precoding matrix indicator (TPMI) groups that deliver full power; receiving configuration information for a physical uplink shared channel (PUSCH) transmission; receiving a TPMI indicating a precoding matrix and a number of layers for the PUSCH transmission; determining the PUSCH transmission based on the configuration information; determining a power level for the PUSCH transmission, wherein the power level corresponds to full power if the TPMI is included in one of the multiple TPMI groups that deliver full power; and transmitting the PUSCH transmission with the determined power level. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
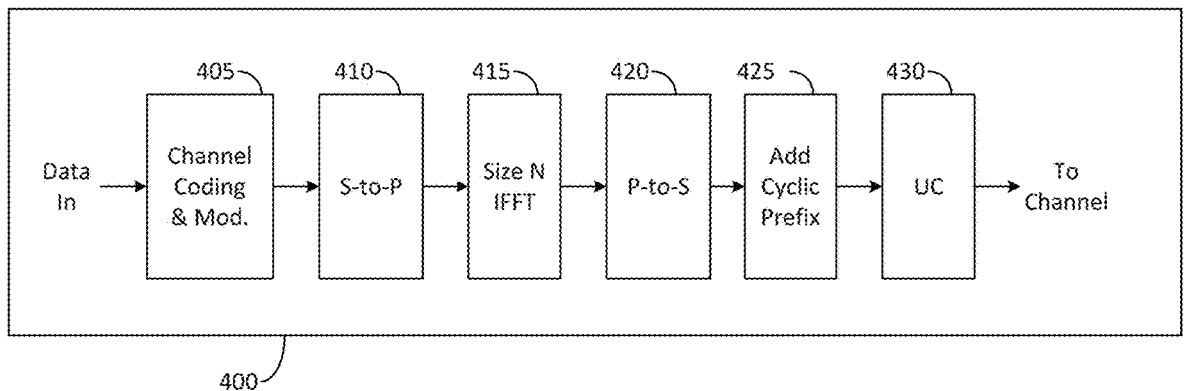
FIG. 4A illustrates a high-level diagram of an orthogonal frequency division multiple access transmit path according to embodiments of the present disclosure.
Figure 4B:
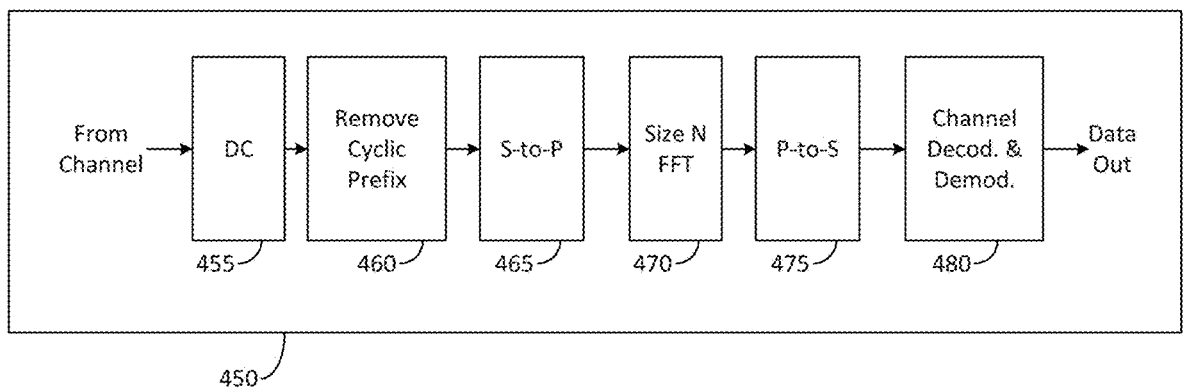
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460 and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIB s that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes N EPDCCH sub-carriers, or resource elements (REs), such as 12 REs. A unit of one RB over one subframe is referred to as a PRB. A UE can be allocated $n_s=(n_{s0}+y \cdot N_{EPDCCH}) \mod D$ RBs for a total of $Z=O_F+\lfloor(n_{s0}+y \cdot N_{EPDCCH})/D\rfloor$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
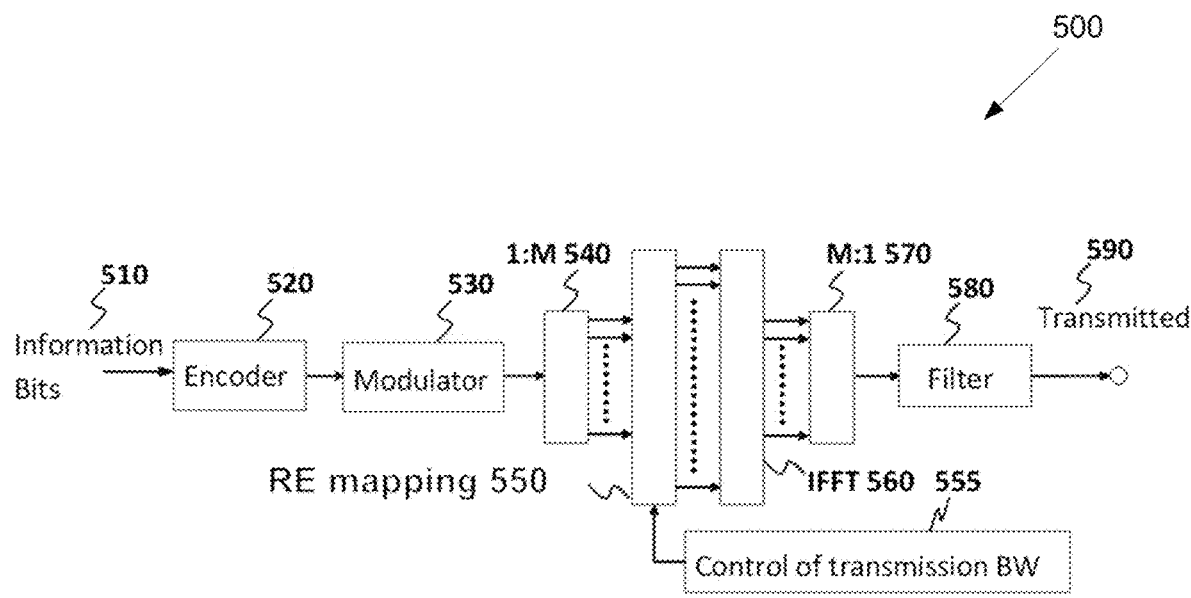
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
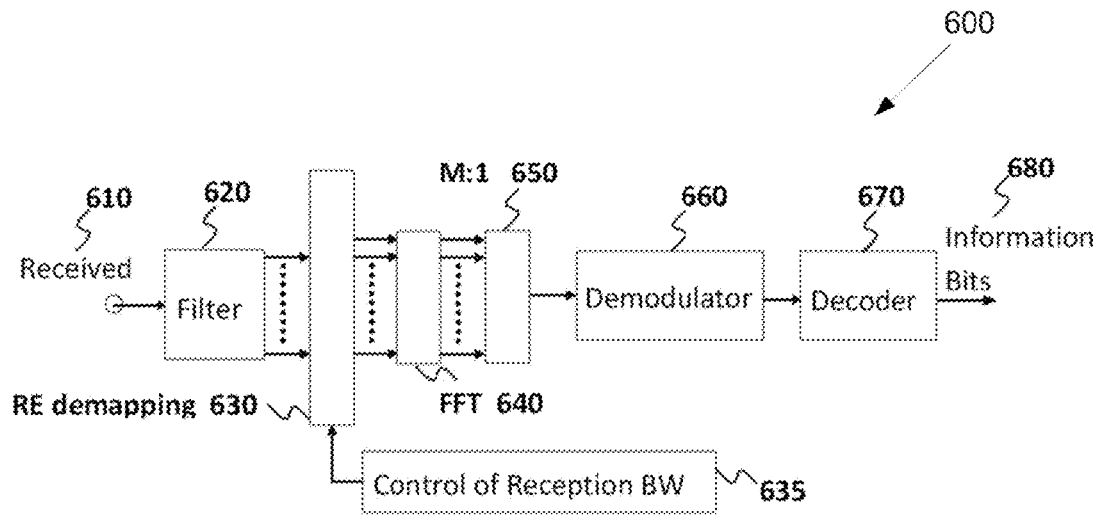
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
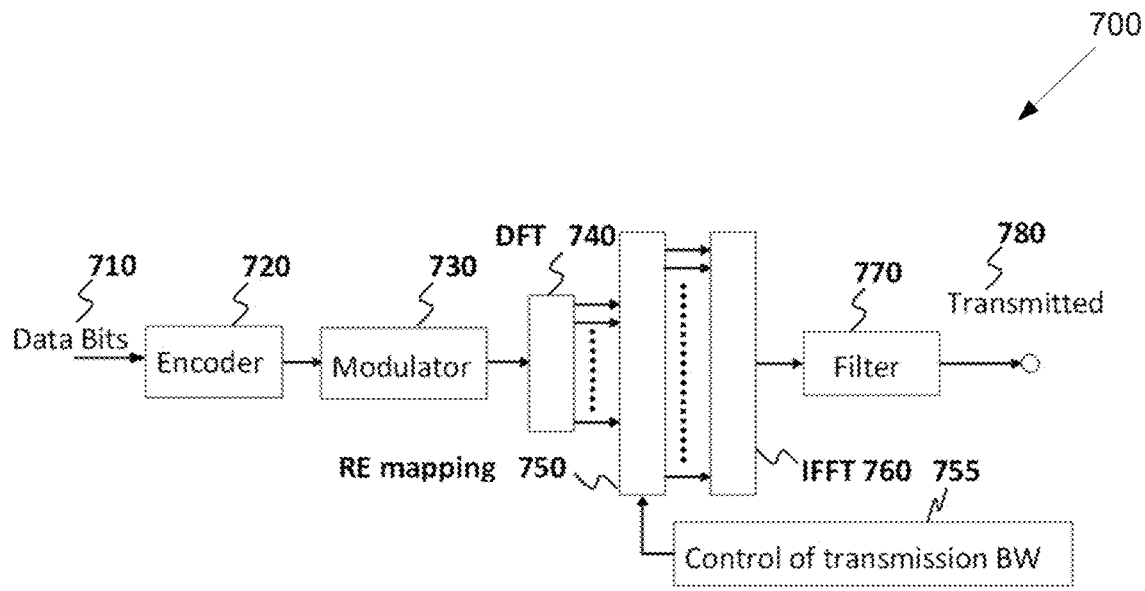
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
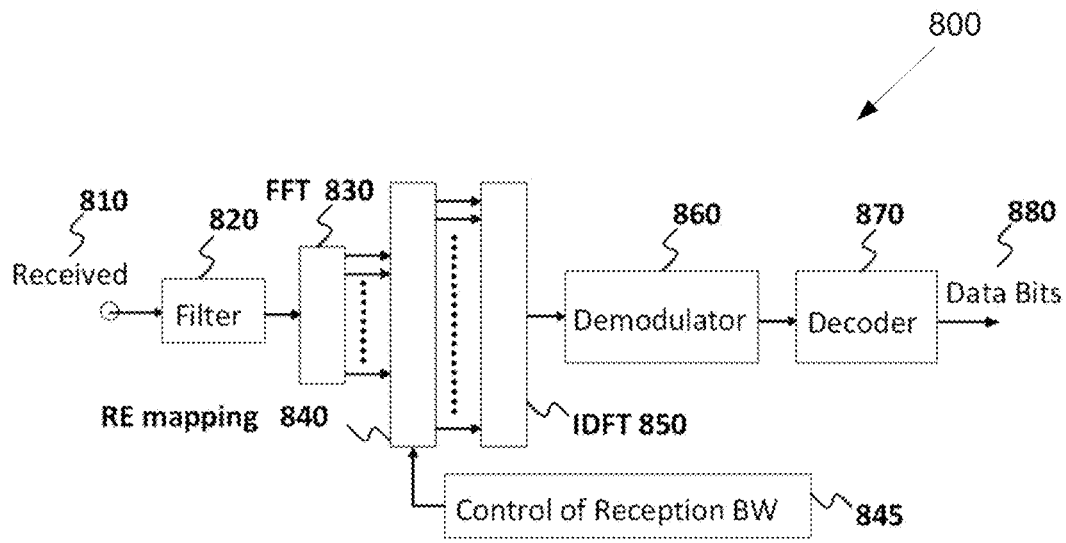
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

Figure 9:
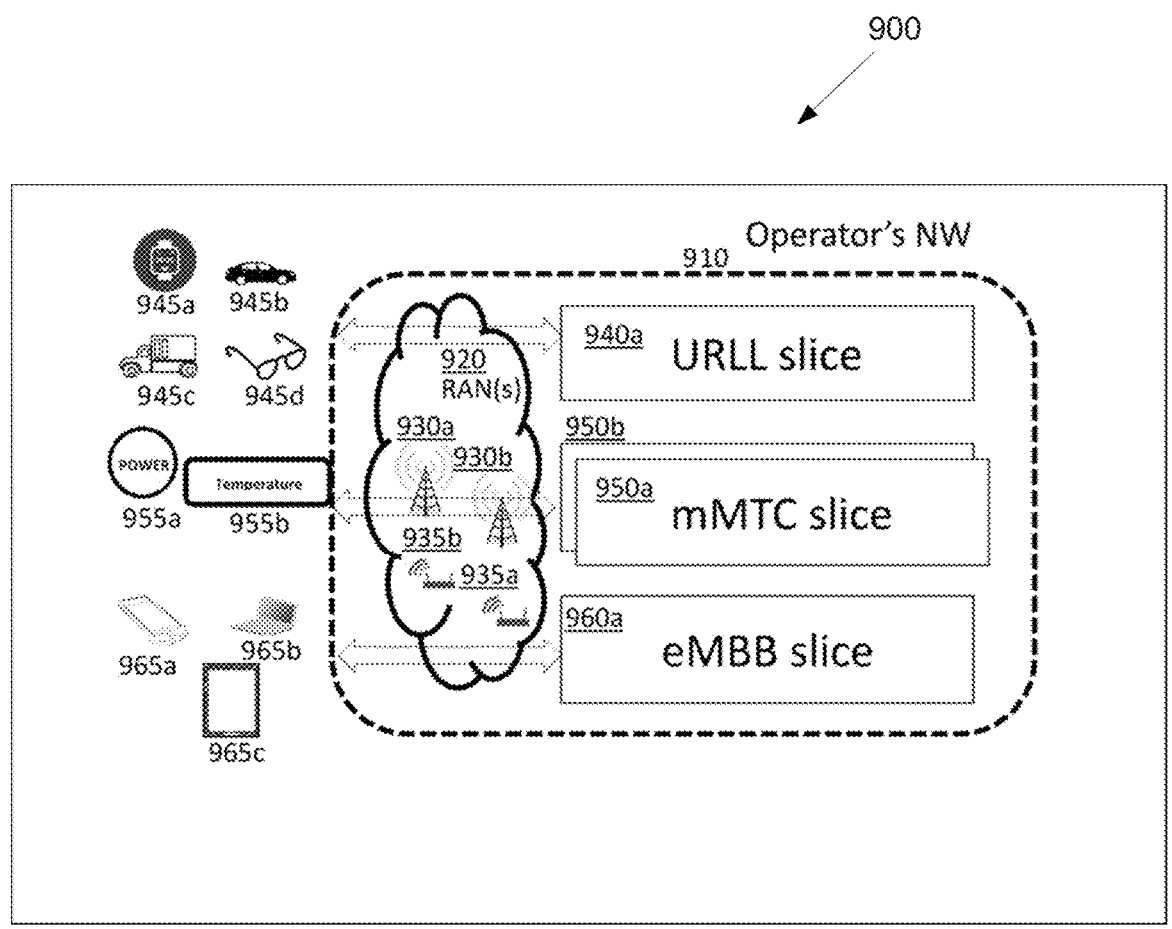
FIG. 9 illustrates an example network configuration according to embodiments of the present disclosure.

FIG. 9 illustrates an example network configuration 900 according to embodiments of the present disclosure. The embodiment of the network configuration 900 illustrated in FIG. 9 is for illustration only. FIG. 9 does not limit the scope of this disclosure to any particular implementation of the configuration 900.

In order for the 5G network to support such diverse services with different quality of services (QoS), one scheme has been identified in 3GPP specification, called network slicing.

As shown in FIG. 9, An operator's network 910 includes a number of radio access network(s) 920 (RAN(s)) that are associated with network devices such as gNBs 930a and 930b, small cell base stations (femto/pico gNBs or Wi-Fi access points) 935a and 935b. The network 910 can support various services, each represented as a slice.

In the example, an URLL slice 940a serves UEs requiring URLL services such as cars 945b, trucks 945c, smart watches 945a, and smart glasses 945d. Two mMTC slices 950a and 550b serve UEs requiring mMTC services such as power meters 555b, and temperature control box 955b. One eMBB slice 960a serves UEs requiring eMBB services such as cells phones 965a, laptops 965b, and tablets 965c. A device configured with two slices can also be envisioned.

Figure 10:
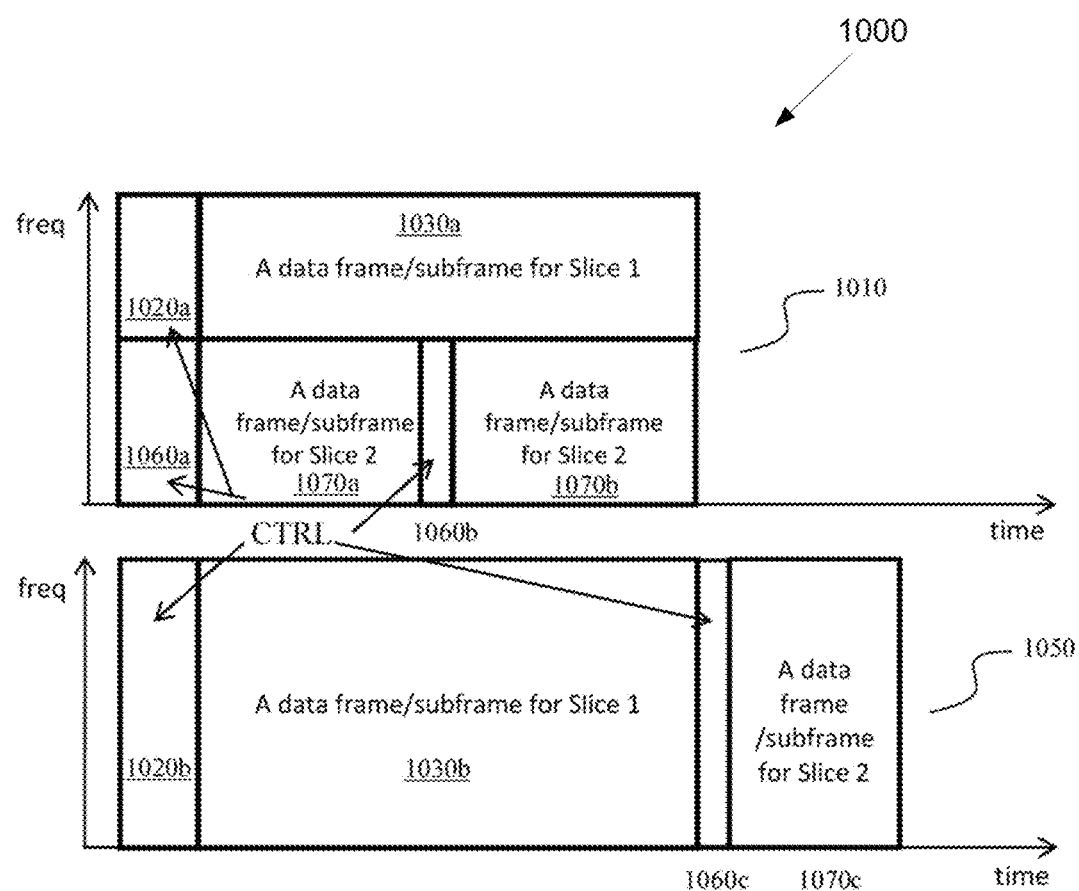
FIG. 10 illustrates an example multiplexing of two slices according to embodiments of the present disclosure.

FIG. 10 illustrates an example multiplexing of two slices 1000 according to embodiments of the present disclosure. The embodiment of the multiplexing of two slices 1000 illustrated in FIG. 10 is for illustration only. FIG. 10 does not limit the scope of this disclosure to any particular implementation of the multiplexing of two slices 1000.

Two exemplary instances of multiplexing two slices within a common subframe or frame are depicted in FIG. 10. In these exemplary embodiments, a slice can be composed of one or two transmission instances where one transmission instance includes a control (CTRL) component (e.g., 1020a, 1060a, 1060b, 1020b, or 1060c) and a data component (e.g., 1030a, 1070a, 1070b, 1030b, or 1070c). In embodiment 1010, the two slices are multiplexed in frequency domain whereas in embodiment 1050, the two slices are multiplexed in time domain. These two slices can be transmitted with different sets of numerology.

The 3GPP specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 11:
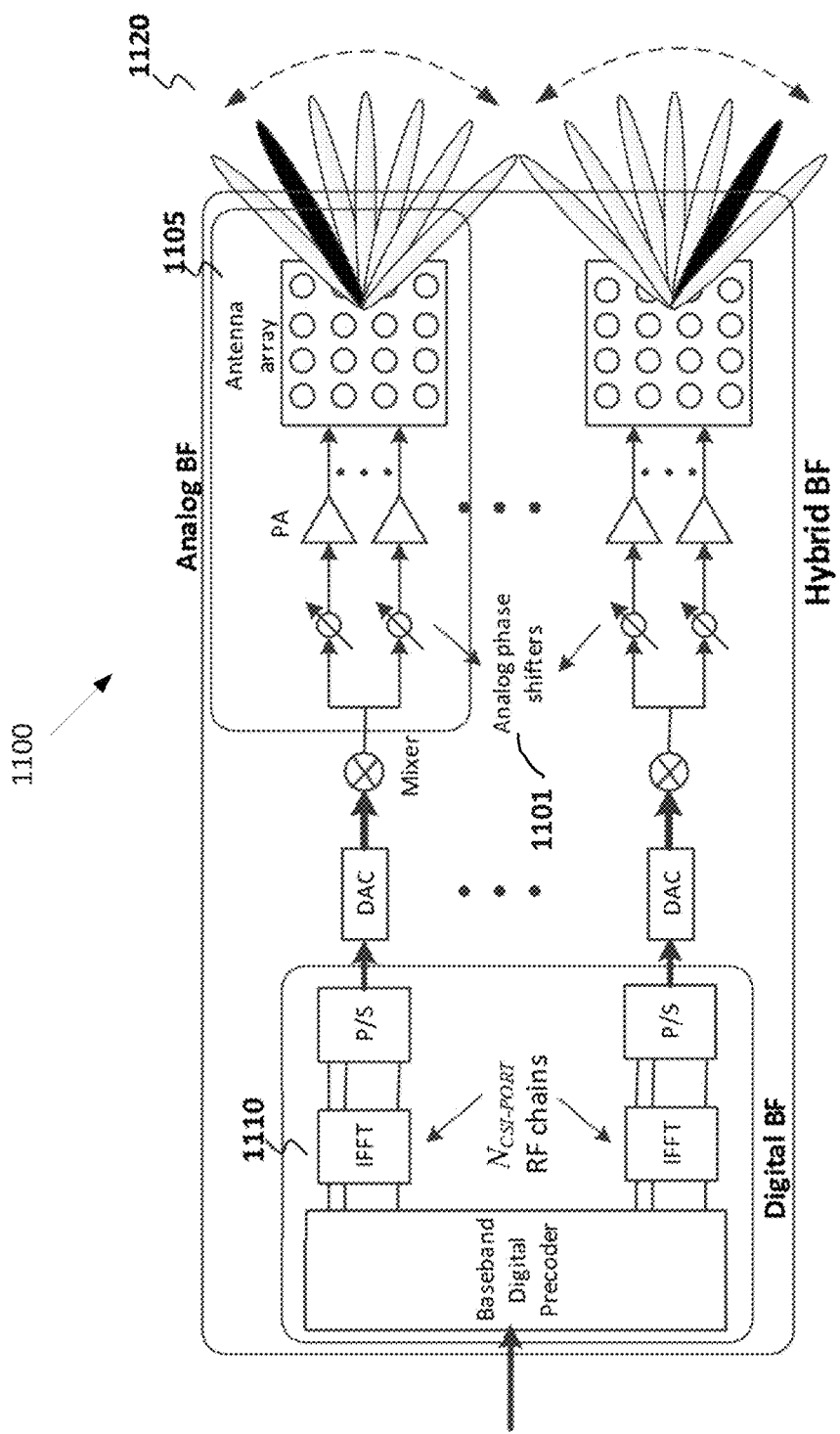
FIG. 11 illustrates an example of beams according to embodiments of the present disclosure.

FIG. 11 illustrates an example of beams 1100 according to embodiments of the present disclosure. The embodiment of the beams 1100 illustrated in FIG. 11 is for illustration only. One or more of the components illustrated in FIG. 11 can be implemented in specialized circuitry configured to perform the noted functions or one or more of the components can be implemented by one or more processors executing instructions to perform the noted functions. FIG. 11 does not limit the scope of this disclosure to any particular implementation of the beams 1100.

The 3GPP NR specification supports up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 11. In this case, one CSI-RS port is mapped onto a large number of antenna elements which can be controlled by a bank of analog phase shifters 1101. One CSI-RS port can then correspond to one sub-array which produces a narrow analog beam through analog beamforming 1105. This analog beam can be configured to sweep across a wider range of angles (1120) by varying the phase shifter bank across symbols or subframes. The number of sub-arrays (equal to the number of RF chains) is the same as the number of CSI-RS ports $N_{CSI\text{-}PORT}$. A digital beamforming unit 1110 performs a linear combination across $N_{CSI\text{-}PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanism corresponding to three types of CSI-RS measurement behavior are supported in Rel.13 LTE: 1) 'CLASS A' CSI reporting which corresponds to non-precoded CSI-RS, 2) 'CLASS B' reporting with K=1 CSI-RS resource which corresponds to UE-specific beamformed CSI-RS, 3) 'CLASS B' reporting with K>1 CSI-RS resources which corresponds to cell-specific beamformed CSI-RS. For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (consisting of multiple ports). Here, (at least at a given time/frequency) CSI-RS ports have narrow beam widths and hence not cell wide coverage, and (at least from the eNB perspective) at least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of its representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In the 3GPP LTE specification, UL SU-MIMO transmission is supported using a codebook-based transmission scheme. That is, an UL grant (containing DCI format 4) includes a single PMI field (along with RI) which indicates the single precoding vector or matrix (from a predefined codebook) a UE shall use for the scheduled UL transmission. Therefore, when multiple PRBs are allocated to the UE, a single precoding matrix indicated by the PMI implies that wideband UL precoding is utilized.

Despite its simplicity, this is clearly sub-optimal since typical UL channel is frequency-selective and a UE is frequency scheduled to transmit using multiple PRBs. Yet another drawback of 3GPP LTE UL SU-MIMO is its lack of support for scenarios where accurate UL-CSI is unavailable at the eNB (which is essential for properly operating codebook-based transmission). This situation can happen in scenarios with high-mobility UEs or bursty inter-cell interference in cells with poor isolation.

Therefore, there is a need for designing new components to enable more efficient support for UL MIMO for the following reasons. First, the support for frequency-selective (or subband) precoding for UL MIMO is desired whenever possible. Second, UL MIMO should offer competitive performance even when accurate UL-CSI is unavailable at the eNB. Third, the proposed UL MIMO solution should be able to exploit UL-DL reciprocity where CSI-RS is utilized by the UE to provide UL-CSI estimation for TDD scenarios.

In LTE UL codebook, pre-coders with antenna selection has been supported in order to keep peak-to-average power ratio (PAPR) low and cubic-metric (CM) for rank>1 small. Antenna selection offers performance improvement in some scenarios, especially for SC-FDMA based UL in LTE. However, for 5G NR systems, it has been agreed in 3GPP RAN1 that UL is primarily going to be CP-OFDM based, although SC-FDMA based will also be supported. It is unclear that antenna selection will show any performance gain in case of CP-OFDM based UL. Whether antenna selection is considered or not, there are several alternatives for UL codebook in 5G NR. In addition, the UL codebook design is also dependent on whether or not the UE is capable to transmit UL data (PUSCH) using all of, or a subset of antenna ports. For example, the UE can be capable of at least one of full-coherent (all antenna ports), partial-coherent (a subset of antenna ports), or non-coherent UL transmission (a single antenna port) to transmit a layer in UL. The 5G NR UL codebook has been designed keeping this UE coherence capability in mind. However, if there are some issues (as explained later) with UL power control if UL power control similar to LTE is applied. This disclosure address a few example embodiments for the UL power control to overcome these issues.

In 3GPP NR, the UL transmission is configured to be either codebook-based or non-codebook-based via higher layer parameter txConfig in PUSCH-Config set to either "codebook" or "nonCodebook."

According to 3GPP NR specification, the following is supported for codebook based UL transmission. For codebook based transmission, the UE determines the UE's codebook subsets based on TPMI and upon the reception of higher layer parameter ULCodebookSubset or codebookSubset in PUSCH-Config which may be configured with "fullAndPartialAndNonCoherent," or "partialAndNonCoherent," or "nonCoherent" depending on the UE capability. The maximum transmission rank may be configured by the higher parameter ULmaxRank or maxRank in PUSCH-Config.

A UE reporting the UE's UE capability of "partialAndNonCoherent" transmission may not expect to be configured by ULCodebookSubset with "fullAndPartialAndNonCoherent."

A UE reporting the UE's UE capability of "Non-Coherent" transmission may not expect to be configured by ULCodebookSubset with "fullAndPartialAndNonCoherent" or with "partialAndNonCoherent."

A UE may not expect to be configured with the higher layer parameter ULCodebookSubset set to "partialAndNonCoherent" when two antenna ports are configured.

In the present disclosure, "fullAndPartialAndNonCoherent," "partialAndNonCoherent." and "Non-Coherent" are referred to as the three examples of coherence type/capability, where the term "coherence" implies a subset of antenna ports at the UE that can be used to transmit a layer of UL data coherently.

According to the NR specification, for non-codebook-based UL transmission, the precoding matrix W equals the identity matrix. For codebook-based UL transmission, the precoding matrix W is given by W=1 for single-layer transmission on a single antenna port, otherwise by Table 1 to Table 6.

The subset of TPMI indices for the three coherence types are summarized in Table 7 and Table 8 where rank=r corresponds to (and is equivalent to) r layers.

The rank (or number of layers) and the corresponding precoding matrix W are indicated to the UE using TRI and TPMI, respectively. In one example, this indication is joint via a field "Precoding information and number of layers" in DCI, e.g., using DCI format 0_1. In another example, this indication is via higher layer RRC signaling. In one example, the mapping between a field "Precoding information and number of layers" and TRI/TPMI is according to NR.

TABLE 1

Precoding matrix W for single-layer transmission using two antenna ports

| TPMI index | W (ordered from left to right in increasing order of TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

TABLE 2

Precoding matrix W for single-layer transmission using four antenna ports with transform precoding enabled.

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

TABLE 3

Precoding matrix W for two-layer transmission using two antenna ports with transform precoding disabled.

| TPMI index | W (ordered from left to right in increasing order of TPMI index) |
|---|---|
| 0-2 | $\frac{1}{\sqrt{2}}\begin{bmatrix}1 & 0\\0 & 1\end{bmatrix}$ $\frac{1}{2}\begin{bmatrix}1 & 1\\1 & -1\end{bmatrix}$ $\frac{1}{2}\begin{bmatrix}1 & 1\\j & -j\end{bmatrix}$ |

TABLE 4

Precoding matrix W for two-layer transmission using four antenna ports with transform precoding disabled.

| TPMI index | W (ordered from left to right in increasing order of TPMI index) |
|---|---|
| 0-3 | $\frac{1}{2}\begin{bmatrix}1 & 0\\0 & 1\\0 & 0\\0 & 0\end{bmatrix}$ $\frac{1}{2}\begin{bmatrix}1 & 0\\0 & 0\\0 & 1\\0 & 0\end{bmatrix}$ $\frac{1}{2}\begin{bmatrix}1 & 0\\0 & 0\\0 & 0\\0 & 1\end{bmatrix}$ $\frac{1}{2}\begin{bmatrix}0 & 0\\1 & 0\\0 & 1\\0 & 0\end{bmatrix}$ |

TABLE 4-continued

Precoding matrix W for two-layer transmission using four antenna ports with transform precoding disabled.

| TPMI index | W (ordered from left to right in increasing order of TPMI index) |
|---|---|
| 4-7 | $\frac{1}{2}\begin{bmatrix}0 & 0\\1 & 0\\0 & 0\\0 & 1\end{bmatrix}$ $\frac{1}{2}\begin{bmatrix}0 & 0\\0 & 0\\1 & 0\\0 & 1\end{bmatrix}$ $\frac{1}{2}\begin{bmatrix}1 & 0\\0 & 1\\1 & 0\\0 & -j\end{bmatrix}$ $\frac{1}{2}\begin{bmatrix}1 & 0\\0 & 1\\1 & 0\\0 & j\end{bmatrix}$ |

TABLE 4-continued

Precoding matrix W for two-layer transmission using four antenna ports with transform precoding disabled.

| TPMI index | W (ordered from left to right in increasing order of TPMI index) |
|---|---|
| 8-11 | $\frac{1}{2}\begin{bmatrix}1&0\\0&1\\-j&0\\0&1\end{bmatrix}$ $\frac{1}{2}\begin{bmatrix}1&0\\0&1\\-j&0\\0&-1\end{bmatrix}$ $\frac{1}{2}\begin{bmatrix}1&0\\0&1\\-1&0\\0&-j\end{bmatrix}$ $\frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}$ $\frac{1}{2}\begin{bmatrix}1&0\\0&1\\j&0\\0&-1\end{bmatrix}$ $\frac{1}{2\sqrt{2}}\begin{bmatrix}1&1\\1&1\\1&-1\\1&-1\end{bmatrix}$ $\frac{1}{2\sqrt{2}}\begin{bmatrix}1&1\\1&1\\j&-j\\j&-j\end{bmatrix}$ |
| 16-19 | $\frac{1}{2\sqrt{2}}\begin{bmatrix}1&1\\j&j\\1&-1\\j&-j\end{bmatrix}$ $\frac{1}{2\sqrt{2}}\begin{bmatrix}1&1\\j&j\\j&-j\\-1&1\end{bmatrix}$ $\frac{1}{2\sqrt{2}}\begin{bmatrix}1&1\\-1&-1\\1&-1\\-1&1\end{bmatrix}$ $\frac{1}{2\sqrt{2}}\begin{bmatrix}1&1\\-1&-1\\j&-j\\-j&j\end{bmatrix}$ |
| 20-21 | $\frac{1}{2\sqrt{2}}\begin{bmatrix}1&1\\-j&-j\\1&-1\\-j&j\end{bmatrix}$ $\frac{1}{2\sqrt{2}}\begin{bmatrix}1&1\\-j&-j\\j&-j\\1&-1\end{bmatrix}$ |

TABLE 7

TPMI indices for 2 antenna ports

| Rank | Non-Coherent | fullAndPartialAndNonCoherent |
|---|---|---|
| 1 | 0-1 | 0-5 |
| 2 | 0 | 0-2 |

TABLE 8

TPMI indices for 4 antenna ports

| Rank | Non-Coherent | partialAnd NonCoherent | fullAndPartial AndNonCoherent |
|---|---|---|---|
| 1 | 0-3 | 0-11 | 0-27 |
| 2 | 0-5 | 0-13 | 0-21 |
| 3 | 0 | 0-2 | 0-6 |
| 4 | 0 | 0-2 | 0-4 |

TABLE 5

Precoding matrix W for three-layer transmission using four antenna ports with transform precoding disabled.

| TPMI index | W (ordered from left to right in increasing order of TPMI index) |
|---|---|
| 0-3 | $\frac{1}{2}\begin{bmatrix}1&0&0\\0&1&0\\0&0&1\\0&0&0\end{bmatrix}$ $\frac{1}{2}\begin{bmatrix}1&0&0\\0&1&0\\1&0&0\\0&0&1\end{bmatrix}$ $\frac{1}{2}\begin{bmatrix}1&0&0\\0&1&0\\-1&0&0\\0&0&1\end{bmatrix}$ $\frac{1}{2\sqrt{3}}\begin{bmatrix}1&1&1\\1&-1&1\\1&1&-1\\1&-1&-1\end{bmatrix}$ |
| 4-6 | $\frac{1}{2\sqrt{3}}\begin{bmatrix}1&1&1\\1&-1&1\\j&j&-j\\j&-j&-j\end{bmatrix}$ $\frac{1}{2\sqrt{3}}\begin{bmatrix}1&1&1\\-1&1&-1\\1&1&-1\\-1&1&1\end{bmatrix}$ $\frac{1}{2\sqrt{3}}\begin{bmatrix}1&1&1\\-1&1&-1\\j&j&-j\\-j&j&j\end{bmatrix}$ |

TABLE 6

Precoding matrix W for four-layer transmission using four antenna ports with transform precoding disabled.

| TPMI index | W (ordered from left to right in increasing order of TPMI index) |
|---|---|
| 0-3 | $\frac{1}{2}\begin{bmatrix}1&0&0&0\\0&1&0&0\\0&0&1&0\\0&0&0&1\end{bmatrix}$ $\frac{1}{2\sqrt{2}}\begin{bmatrix}1&1&0&0\\0&0&1&1\\1&-1&0&0\\0&0&1&-1\end{bmatrix}$ $\frac{1}{2\sqrt{2}}\begin{bmatrix}1&1&0&0\\0&0&1&1\\j&-j&0&0\\0&0&j&-j\end{bmatrix}$ $\frac{1}{4}\begin{bmatrix}1&1&1&1\\1&-1&1&-1\\1&1&-1&-1\\1&-1&-1&1\end{bmatrix}$ |
| 4 | $\frac{1}{4}\begin{bmatrix}1&1&1&1\\1&-1&1&-1\\j&j&-j&-j\\j&-j&-j&j\end{bmatrix}$ |

TABLE 9

Total power of precoding matrix W for 2 antenna ports

| | Non-Coherent TPMIs | | Full-Coherent TPMIs | |
|---|---|---|---|---|
| Rank | TPMI indices | Total power | TPMI indices | Total power |
| 1 | 0-1 | ½ | 2-5 | 1 |
| 2 | 0 | 1 | 1-2 | 1 |

TABLE 10

Total power of precoding matrix W for 4 antenna ports

| | Non-Coherent TPMIs | | Partial-Coherent TPMIs | | Full-Coherent TPMIs | |
|---|---|---|---|---|---|---|
| Rank | TPMI indices | Total power | TPMI indices | Total power | TPMI indices | Total power |
| 1 | 0-3 | ¼ | 4-11 | ½ | 12-27 | 1 |
| 2 | 0-5 | ½ | 6-13 | 1 | 14-21 | 1 |
| 3 | 0 | ¾ | 1-2 | 1 | 3-6 | 1 |
| 4 | 0 | 1 | 1-2 | 1 | 3-4 | 1 |

The total power of the pre-coding matrix W for different rank and coherence types is summarized in Table 9 and Table 10. The following issues can be observed.

In one issue, for non-coherent and partial-coherent TPMIs, total power increases as rank increases, which implies that the TPMI selection will be biased to higher rank. In particular, even for cell-edge UEs, rank 1 TPMI may not be selected, which can severely affect cell-edge performance.

In another issue, for a given rank, total power of non-coherent TPMIs≤total power of partial-coherent TPMIs≤total power of full-coherent TPMIs. The reason for this trend is that the power of non-zero antenna ports does not change across three types of TPMIs. This may be beneficial in some scenarios, for example, UE implementation for power saving. However, this may not be desired always.

The abovementioned issues can be handled by TPMI or TPMI group signaling from the UE (as part of UE capability signaling), where the signaling indicates TPMIs or TPMI groups for which the UE can achieve full power in UL transmission. This disclosure proposes several embodiments on such TPMI or TPMI group signaling.

In embodiment 1, a UE reports, via UE capability signaling (e.g., UL full power model), whether it is capable of full power UL transmission for codebook-based UL transmission. The UE may or may not report additional details about the UE capability signaling, i.e., any additional details (e.g., TPMI or TPMI group signaling) is subject to UE capability, i.e., it can be optional feature to a UE.

When the UE reports additional details about the UE capability signaling, then the additional detail includes a B-bit signaling, where the B-bit signaling $S=b_0 \ldots b_{B-1}$ indicates (reports) a TPMI or a TPMI group that can be used to transmit UL transmission at full power. Optionally, the additional detail includes a parameter P (indication) indicating one TPMI group out of a plurality of TPMI groups. In one example, a TPMI group is defined as a group (set) of TPMIs (indicating precoding matrices) in the UL codebook. The number of supported TPMI groups (Z) can be fixed or configured or reported by the UE.

When the UE has 2 antenna ports and the supported TPMI groups include only a non-coherent TPMIs, the parameter P or the 2-bit signaling S indicates one of the supported TPMI groups G0 ... G2 given by Table 11. In one example, the UE is a non-coherent capable UE. In one example, the UE is a non-coherent capable or full-coherent (FC+PC+NC) capable UE. In one example, the UE is a non-coherent capable or full-coherent (FC+PC+NC) capable or partial-coherent (PC+NC) capable UE. When 2-bit signaling $S=b_0 b_1$ (e.g. bitmap) is used, bits $b_0$ and $b_1$ (or $b_1$ and $b_0$) correspond to TPMIs $$\frac{1}{\sqrt{2}}\begin{bmatrix}1\\0\end{bmatrix} \text{ and } \frac{1}{\sqrt{2}}\begin{bmatrix}0\\1\end{bmatrix},$$

respectively.

TABLE 11 mapping of 2-bit indication to TPMI or TPMI grouping for non-coherent UE with 2 antenna ports

| Bitmap $b_0 b_1$ | TPMI group | TPMI pre-coder/pre-coding matrices | TPMIs in Rel. 15 NR 2Tx UL codebook |
|---|---|---|---|
| 10 or 10 | G0 | $\frac{1}{\sqrt{2}}\begin{bmatrix}1\\0\end{bmatrix}$ | Rank 1 TPMI 0 |
| 01 or 01 | G1 | $\frac{1}{\sqrt{2}}\begin{bmatrix}0\\1\end{bmatrix}$ | Rank 1 TPMI 1 |
| 11 | G2 | $\frac{1}{\sqrt{2}}\begin{bmatrix}1\\0\end{bmatrix}, \frac{1}{\sqrt{2}}\begin{bmatrix}0\\1\end{bmatrix}$ | Rank 1 TPMI 0, 1 |

When the UE has 4 antenna ports and the supported TPMI groups include only non-coherent TPMIs, the parameter P indicates one of the supported TPMI groups G0 ... G3 given by Table 12. In one example, the UE is a non-coherent capable UE. In one example, the UE is a non-coherent capable or full-coherent (FC+PC+NC) capable UE. In one example, the UE is a non-coherent capable or full-coherent (FC+PC+NC) capable or partial-coherent (PC+NC) capable UE.

TABLE 12 mapping of 2-bit indication to TPMI or TPMI grouping for non-coherent UE with 4 antenna ports

| TPMI group | TPMI pre-coder/pre-coding matrices | TPMIs in Rel. 15 NR 4Tx UL codebook |
|---|---|---|
| G0 | $\frac{1}{2}\begin{bmatrix}1\\0\\0\\0\end{bmatrix}$ | Rank 1 TPMI 0 |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ | Rank 1 TPMI 0, 2; Rank 2 TPMI 1 |

TABLE 12-continued mapping of 2-bit indication to TPMI or TPMI grouping for non-coherent UE with 4 antenna ports

| TPMI group | TPMI pre-coder/pre-coding matrices | TPMIs in Rel. 15 NR 4Tx UL codebook |
|---|---|---|
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix},$ $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix},$ $\frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ | Rank 1 TPMI 0, 1, 2; Rank 2 TPMI 0, 1, 3; Rank 3 TPMI 0 |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ | Rank 2 TPMI 0, 1, 3; Rank 3 TPMI 0 |

When the UE has 4 antenna ports and the supported TPMI groups include only partial-coherent or/and non-coherent TPMIs, the parameter P indicates one of the supported TPMI groups given by at least one of the following alternatives. In one example, the UE is a non-coherent capable UE. In one example, the UE is a non-coherent capable or partial-coherent (PC+NC) capable UE. In one example, the UE is a non-coherent capable or full-coherent (FC+PC+NC) capable or partial-coherent (PC+NC) capable UE.

In one alternative Alt 1-1, the supported TPMI groups are defined by G0 . . . G6 as shown in Table 13.

TABLE 13

Example of TPMI groups

| TPMI Groups | TPMI pre-coder/pre-coding matrices | TPMIs in Rel. 15 NR 4Tx UL codebook |
|---|---|---|
| G0 | $\frac{1}{2}\begin{bmatrix}1\\0\\0\\0\end{bmatrix}$ | Rank 1 TPMI 0 |
| G1 | $\left\{\frac{1}{2}\begin{bmatrix}1\\0\\0\\0\end{bmatrix}, \frac{1}{2}\begin{bmatrix}0\\0\\1\\0\end{bmatrix}\right\}; \left\{\frac{1}{2}\begin{bmatrix}1&0\\0&0\\0&1\\0&0\end{bmatrix}\right\}$ | Rank 1 TPMI 0, 2; Rank 2 TPMI 1 |
| G2 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}; \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}; \left\{\frac{1}{2}\begin{bmatrix}1&0&0\\0&1&0\\0&0&1\\0&0&0\end{bmatrix}\right\}$ | Rank 1 TPMI 0, 1, 2; Rank 2 TPMI 0, 1, 3; Rank 3 TPMI 0 |
| G3 | $\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}; \left\{\frac{1}{2}\begin{bmatrix}1&0&0\\0&1&0\\0&0&1\\0&0&0\end{bmatrix}\right\}$ | Rank 2 TPMI 0, 1, 3; Rank 3 TPMI 0 |
| G4 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}; \frac{1}{2}\begin{bmatrix}1&0\\0&0\\0&1\\0&0\end{bmatrix}$ | Rank 1 TPMI 4, 5, 6, 7; Rank 2 TPMI 1; |
| G5 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}; \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\};$ $\frac{1}{2}\begin{bmatrix}1&0&0\\0&1&0\\0&0&1\\0&0&0\end{bmatrix}$ | Rank 1 TPMI 4, 5, 6, 7; Rank 2 TPMI 0, 1, 3; Rank 3 TPMI 0 |

TABLE 13-continued

Example of TPMI groups

| TPMI Groups | TPMI pre-coder/pre-coding matrices | TPMIs in Rel. 15 NR 4Tx UL codebook |
|---|---|---|
| G6 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}; \left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\};$ $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\};$ $\frac{1}{2}\begin{bmatrix}1&0&0\\0&1&0\\0&0&1\\0&0&0\end{bmatrix}$ | Rank 1 TPMI 4, 5, 6, 7, 8, 9, 10, 11; Rank 2 TPMI 0, 1, 2, 3, 4, 5; Rank 3 TPMI 0 |

When the UE is a non-coherent capable UE with 4 antenna ports, and the UE reports one of G4-G6, then the NC TPMIs can be deduced (derived) from the reported TPMI group by removing the partial-coherent precoders (since the codebook for a NC UE doesn't include PC pre-coders). For example, the deduced (derived) NC TPMIs for a NC UE are as shown in Table 14.

TABLE 14

Example of deduced TPMI groups for a NC UE

| TPMI Groups | TPMI pre-coder/pre-coding matrices | Deduced (derived) NC TPMIs |
|---|---|---|
| G4 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}$ | $\frac{1}{2}\begin{bmatrix}1&0\\0&0\\0&1\\0&0\end{bmatrix}, \frac{1}{2}\begin{bmatrix}1&0\\0&0\\0&1\\0&0\end{bmatrix}$ |
| G5 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\};$ $\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}$ | $\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}; \frac{1}{2}\begin{bmatrix}1&0&0\\0&1&0\\0&0&1\\0&0&0\end{bmatrix}$ |
| G6 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\};$ $\left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\};$ $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}\right\};$ $\left\{\frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\}$ | $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}\right\}, \left\{\frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\}; \frac{1}{2}\begin{bmatrix}1&0&0\\0&1&0\\0&0&1\\0&0&0\end{bmatrix}$ |

In one example, a NC capable UE with 4 antenna ports can report a TPMI group from a set of TPMI groups S, wherein the set S includes all of or a subset of G0-G6 and is determined according to at least one of the following examples, where G0-G3 are as shown in Table 12 and G4-G6 are deduced as in Table 14.

In one example, S={G0, G1, G2, G3}.
In one example, S={G0, G1, G2, G4}.
In one example, S={G0, G1, G2, G5}.
In one example, S={G0, G1, G2, G6}.
In one example, S={G0, G1, G2, G3, G4}.
In one example, S={G0, G1, G2, G3, G5}.
In one example, S={G0, G1, G2, G3, G6}.
In one example, S={G0, G1, G2, G4, G5}.
In one example, S={G0, G1, G2, G4, G6}.
In one example, S={G0, G1, G2, G5, G6}.
In one example, S={G0, G1, G2, G3, G4, G5}.
In one example, S={G0, G1, G2, G3, G4, G6}.
In one example, S={G0, G1, G2, G4, G5, G6}.
In one example, S={G0, G1, G2, G3, G4, G5, G6}.

In one example, a NC capable UE with 4 antenna ports can report a TPMI group from a set of TPMI groups S, wherein the set S includes all of or a subset of {G0-G3, H1,H2} and is determined according to at least one of the following examples, where {G0-G3, H1, H2} are as shown in Table 15.

In one example, S={G0, G1, G2, G3}.
In one example, S={G0, G1, G2, H1}.
In one example, S={G0, G1, G2, H2}.
In one example, S={G0, G1, G2, G3, H1}.
In one example, S={G0, G1, G2, G3, H2}.
In one example, S={G0, G1, G2, H1, H2}.
In one example, S={G0, G1, G2, G3, H1, H2}.

TABLE 15

Example of TPMI groups

| TPMI Groups | TPMI pre-coder/pre-coding matrices |
|---|---|
| G0 | $\frac{1}{2}\begin{bmatrix}1\\0\\0\\0\end{bmatrix}$ |
| G1 | $\left\{\frac{1}{2}\begin{bmatrix}1\\0\\0\\0\end{bmatrix}, \frac{1}{2}\begin{bmatrix}0\\1\\0\\0\end{bmatrix}\right\}\left\{\frac{1}{2}\begin{bmatrix}1&0\\0&0\\0&1\\0&0\end{bmatrix}\right\}$ |
| G2 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\1\\1\\0\end{bmatrix}\right\};\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\};$ $\frac{1}{2}\begin{bmatrix}1&0&0\\0&1&0\\0&0&1\\0&0&0\end{bmatrix}$ |
| G3 | $\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}; \frac{1}{2}\begin{bmatrix}1&0&0\\0&1&0\\0&0&1\\0&0&0\end{bmatrix}\right\}$ |
| H1 | $\frac{1}{2}\begin{bmatrix}1&0\\0&0\\0&1\\0&0\end{bmatrix}$ |
| H2 | $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}\right.$ $\left.\frac{1}{2}\begin{bmatrix}0&0\\0&0\\1&0\\0&1\end{bmatrix}; \frac{1}{2}\begin{bmatrix}1&0&0\\0&1&0\\0&0&1\\0&0&0\end{bmatrix}\right\}$ |

In one alternative Alt 1-2, the supported TPMI groups are defined by G0 . . . G15 as shown in Table 16.

TABLE 16

Example of TPMI groups

| TPMI Groups | TPMI pre-coder/pre-coding matrices |
|---|---|
| G0 | As in Table 13 |
| G1 | As in Table 13 |
| G2 | As in Table 13 |
| G3 | As in Table 13 |
| G4 | As in Table 13 |
| G5 | As in Table 13 |
| G6 | As in Table 13 |
| G7: union of groups {G0,G4} | $\frac{1}{2}\begin{bmatrix}1\\0\\0\\0\end{bmatrix}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}; \frac{1}{2}\begin{bmatrix}1&0\\0&0\\0&1\\0&0\end{bmatrix}$ |
| G8: union of groups {G0,G5} | $\frac{1}{2}\begin{bmatrix}1\\0\\0\\0\end{bmatrix}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}; \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}; \frac{1}{2}\begin{bmatrix}1&0&0\\0&1&0\\0&0&1\\0&0&0\end{bmatrix}$ |

TABLE 16-continued

Example of TPMI groups

| TPMI Groups | TPMI pre-coder/pre-coding matrices |
|---|---|
| G9: union of groups {G0,G6} | $\frac{1}{2}\begin{bmatrix}1\\0\\0\\0\end{bmatrix}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}; \left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\};$ $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\}; \frac{1}{2}\begin{bmatrix}1&0&0\\0&1&0\\0&0&1\\0&0&0\end{bmatrix}$ |
| G10: union of groups {G1,G4} | $\frac{1}{2}\begin{bmatrix}1\\0\\0\\0\end{bmatrix}, \frac{1}{2}\begin{bmatrix}0\\0\\1\\0\end{bmatrix}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}; \frac{1}{2}\begin{bmatrix}1&0\\0&0\\0&1\\0&0\end{bmatrix}$ |
| G11: union of groups {G1,G5} | $\frac{1}{2}\begin{bmatrix}1\\0\\0\\0\end{bmatrix}, \frac{1}{2}\begin{bmatrix}0\\0\\1\\0\end{bmatrix}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}; \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\};$ $\frac{1}{2}\begin{bmatrix}1&0&0\\0&1&0\\0&0&1\\0&0&0\end{bmatrix}$ |
| G12: union of groups {G1,G6} | $\frac{1}{2}\begin{bmatrix}1\\0\\0\\0\end{bmatrix}, \frac{1}{2}\begin{bmatrix}0\\0\\1\\0\end{bmatrix}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}; \left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\};$ $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\}; \frac{1}{2}\begin{bmatrix}1&0&0\\0&1&0\\0&0&1\\0&0&0\end{bmatrix}$ |
| G13: union of groups {G2,G4} | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}; \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\};$ $\frac{1}{2}\begin{bmatrix}1&0&0\\0&1&0\\0&0&1\\0&0&0\end{bmatrix}$ |
| G14: union of groups {G2,G5} | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}; \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\};$ $\frac{1}{2}\begin{bmatrix}1&0&0\\0&1&0\\0&0&1\\0&0&0\end{bmatrix}$ |
| G15: union of groups {G2,G6} | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}; \left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\};$ $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\}; \frac{1}{2}\begin{bmatrix}1&0&0\\0&1&0\\0&0&1\\0&0&0\end{bmatrix}$ |

In one alternative Alt 1-3, the supported TPMI groups are defined by G0 . . . G14 as shown in Table 17.

TABLE 17

Example of TPMI groups

| TPMI Groups | TPMI pre-coder/pre-coding matrices |
|---|---|
| G0 | As in Table 13 |
| G1 | As in Table 13 |
| G2 | As in Table 13 |
| G3 | As in Table 13 |
| G4 | As in Table 13 |
| G5 | As in Table 13 |
| G6 | As in Table 13 |
| G7 | union of groups {G0, G4} as in Table 16 |
| G8 | union of groups {G0, G5} as in Table 16 |
| G9 | union of groups {G0, G6} as in Table 16 |
| G10 | union of groups {G1, G4} as in Table 16 |
| G11 | union of groups {G1, G5} as in Table 16 |
| G12 | union of groups {G1, G6} as in Table 16 |
| G13 | union of groups {G2, G4} as in Table 16 |
| G14 | union of groups {G2, G6} as in Table 16 |

In one alternative Alt 1-4, the supported TPMI groups are defined by G0 . . . G12 as shown in Table 18.

TABLE 18

Example of TPMI groups

| TPMI Groups | TPMI pre-coder/pre-coding matrices |
|---|---|
| G0 | As in Table 13 |
| G1 | As in Table 13 |
| G2 | As in Table 13 |
| G3 | As in Table 13 |
| G4 | As in Table 13 |
| G5 | As in Table 13 |
| G6 | As in Table 13 |
| G7 | union of groups {G0, G4} as in Table 16 |
| G8 | union of groups {G0, G5} as in Table 16 |
| G9 | union of groups {G0, G6} as in Table 16 |
| G10 | union of groups {G1, G5} as in Table 16 |
| G11 | union of groups {G1, G6} as in Table 16 |
| G12 | union of groups {G2, G6} as in Table 16 |

In one alternative Alt 1-5, the supported TPMI groups are defined by G0 . . . G12 as shown in Table 19.

TABLE 19

Example of TPMI groups

| TPMI Groups | TPMI pre-coder/pre-coding matrices |
|---|---|
| G0 | As in Table 13 |
| G1 | union of groups {G1, G4} as in Table 13 |
| G2 | union of groups {G2, G4} as in Table 13 |
| G3 | As in Table 13 |
| G4 | As in Table 13 |
| G5 | As in Table 13 |
| G6 | As in Table 13 |
| G7 | union of groups {G0, G4} as in Table 16 |
| G8 | union of groups {G0, G5} as in Table 16 |
| G9 | union of groups {G0, G6} as in Table 16 |
| G10 | union of groups {G1, G5} as in Table 16 |
| G11 | union of groups {G1, G6} as in Table 16 |
| G12 | union of groups {G2, G6} as in Table 16 |

In one alternative Alt 1-6, the supported TPMI groups are defined in Table 20.

TABLE 20

Example of TPMI groups

| TPMI Groups | TPMI pre-coder/pre-coding matrices |
|---|---|
| G0 | As in Table 13 |
| G1 | union of groups {G1, G4} as in Table 13 |
| G2 | union of groups {G2, G4} as in Table 13 |
| G4 | As in Table 13 |
| G5 | As in Table 13 |
| G6 | As in Table 13 |
| G7 | union of groups {G0, G4} as in Table 16 |
| G8 | union of groups {G0, G5} as in Table 16 |
| G9 | union of groups {G0, G6} as in Table 16 |
| G10 | union of groups {G1, G5} as in Table 16 |
| G11 | union of groups {G1, G6} as in Table 16 |
| G12 | union of groups {G2, G6} as in Table 16 |

In one alternative Alt 1-7, the supported TPMI groups are defined in Table 21.

TABLE 21

Example of TPMI groups

| TPMI Groups | TPMI pre-coder/pre-coding matrices |
|---|---|
| G0 | As in Table 13 |
| G1 | union of groups {G1, G4} as in Table 13 |
| G2 | union of groups {G2, G4} as in Table 13 |
| G4 | As in Table 13 |
| G5 | As in Table 13 |
| G6 | As in Table 13 |

In one alternative Alt 1-8, the supported TPMI groups are defined in Table 22.

TABLE 22

Example of TPMI groups

| TPMI Groups | TPMI pre-coder/pre-coding matrices |
|---|---|
| G0 | As in Table 13 |
| G1 | As in Table 13 |
| G2 | As in Table 13 |
| G4 | As in Table 13 |
| G5 | As in Table 13 |
| G6 | As in Table 13 |
| G7 | union of groups {G1, G4} as in Table 13 |
| G8 | union of groups {G2, G4} as in Table 13 |

In one alternative Alt 1-9, the supported TPMI groups are defined in Table 23.

TABLE 23

Example of TPMI groups

| TPMI Groups | TPMI pre-coder/pre-coding matrices |
|---|---|
| G0 | As in Table 13 |
| G1 | union of groups {G1, G4} as in Table 13 |
| G2 | union of groups {G2, G4} as in Table 13 |
| G3 | As in Table 13 |
| G4 | As in Table 13 |
| G5 | As in Table 13 |
| G6 | As in Table 13 |

In one alternative Alt 1-10, the supported TPMI groups are defined in Table 24.

TABLE 24

Example of TPMI groups

| TPMI Groups | TPMI pre-coder/pre-coding matrices |
|---|---|
| G0 | As in Table 13 |
| G1 | As in Table 13 |
| G2 | As in Table 13 |
| G3 | As in Table 13 |
| G4 | As in Table 13 |
| G5 | As in Table 13 |
| G6 | As in Table 13 |
| G7 | union of groups {G1, G4} in Table 13 |
| G8 | union of groups {G2, G4} in Table 13 |

In one alternative Alt 1-11, the supported TPMI groups include the ones defined in Table 21. Additionally, N TPMI groups are included from G7-G12 shown in Table 25. In one example, N=1, the additional TPMI is G7. In one example, N=2, the additional TPMIs are (G7,G8) or (G7,G10). In one example, N=3, the additional TPMIs are (G7,G8,G9) or (G7,G8,G10) or (G7,G10,G12). In one example, N=4, the additional TPMIs are (G7,G8,G9,G10) or (G7,G8,G10,G12) or (G7,G8,G10,G12). In one example, N=5, the additional TPMIs are (G7,G8,G9,G10,G11) or (G7,G8,G10,G11,G12) or (G7,G8,G9,G10,G12).

TABLE 25 additional TPMI groups

| G7 | union of groups {G0, G4} as in Table 16 |
|---|---|
| G8 | union of groups {G0, G5} as in Table 16 |
| G9 | union of groups {G0, G6} as in Table 16 |
| G10 | union of groups {G1, G5} as in Table 16 |
| G11 | union of groups {G1, G6} as in Table 16 |
| G12 | union of groups {G2, G6} as in Table 16 |

In one alternative Alt 1-12, the supported TPMI groups include the ones defined in Table 22. Additionally, N TPMI groups are included from G7-G12 shown in Table 25. In one example, N=1, the additional TPMI is G7. In one example, N=2, the additional TPMIs are (G7,G8) or (G7,G10). In one example, N=3, the additional TPMIs are (G7,G8,G9) or (G7,G8,G10) or (G7,G10,G12). In one example, N=4, the additional TPMIs are (G7,G8,G9,G10) or (G7,G8,G10,G12) or (G7,G8,G10,G12). In one example, N=5, the additional TPMIs are (G7,G8,G9,G10,G11) or (G7,G8,G10,G11,G12) or (G7,G8,G9,G10,G12).

In one alternative Alt 1-13, the supported TPMI groups include the ones defined in Table 23. Additionally, N TPMI groups are included from G7-G12 shown in Table 25. In one example, N=1, the additional TPMI is G7. In one example, N=2, the additional TPMIs are (G7,G8) or (G7,G10). In one example, N=3, the additional TPMIs are (G7,G8,G9) or (G7,G8,G10) or (G7,G10,G12). In one example, N=4, the additional TPMIs are (G7,G8,G9,G10) or (G7,G8,G10,G12) or (G7,G8,G10,G12). In one example, N=5, the additional TPMIs are (G7,G8,G9,G10,G11) or (G7,G8,G10,G11,G12) or (G7,G8,G9,G10,G12).

In one alternative Alt 1-14, the supported TPMI groups include the ones defined in Table 24. Additionally, N TPMI groups are included from G7-G12 shown in Table 25. In one example, N=1, the additional TPMI is G7. In one example, N=2, the additional TPMIs are (G7,G8) or (G7,G10). In one example, N=3, the additional TPMIs are (G7,G8,G9) or (G7,G8,G10) or (G7,G10,G12). In one example, N=4, the additional TPMIs are (G7,G8,G9,G10) or (G7,G8,G10,G12) or (G7,G8,G10,G12). In one example, N=5, the additional TPMIs are (G7,G8,G9,G10,G11) or (G7,G8,G10,G11,G12) or (G7,G8,G9,G10,G12).

In embodiment 2, a UE with 2 antenna ports can only report a single TPMI group from the supported TPMI groups for 2 antenna ports and non-coherent TPMI groups.

A UE with 4 antenna ports and non-coherent antennas can only report one of the following.

(A) a single TPMI group from the supported TPMI groups for 4 antenna ports and non-coherent TPMI groups.

(B) a single TPMI group from the supported TPMI groups for 2 antenna ports and non-coherent TPMI groups.

(A) and (B).

(A) or (B).

(A), (B) or both (A) and (B).

The support of one the above can be subject to (an optional) UE capability.

A UE with 4 antenna ports and partial-coherent antennas can only report (A) a single TPMI group from the supported TPMI groups for 4 antenna ports and non-coherent TPMI groups (B) a single TPMI group from the supported TPMI groups for 2 antenna ports and non-coherent TPMI groups.

(C) a single TPMI group from the supported TPMI groups for 4 antenna ports and non-/partial-coherent TPMI groups.

(A) and (B).

(A) or (B).

(A), (B) or both (A) and (B).

(A) and (C).

(A) or (C).

(A), (C) or both (A) and (C).

(C) and (B).

(C) or (B).

(C), (B) or both (C) and (B).

(A), (B) and (C).

The support of one the above can be subject to (an optional) UE capability.

In embodiment 3, a UE with 2 antenna ports can only report a single TPMI group from the supported TPMI groups for 2 antenna ports and non-coherent TPMI groups. An example of the supported TPMI groups G0-G2 is shown in Table 11. In one example, this reporting is via a 2-bit indication or via a parameter which can take three values one for each of G0-G2. In one example, this reporting is regardless of the coherence capability reported by the UE. For instance, the reporting is the same for both non-coherent and full-coherent UEs.

A UE with 4 antenna ports and non-coherent antennas (i.e., NC UE with 4 antenna ports) can only report one of the following.

(A) a single TPMI group from the supported TPMI groups for 4 antenna ports and non-coherent TPMI groups.

(B) a single TPMI group from the supported TPMI groups for 2 antenna ports and non-coherent TPMI groups.

(A) and (B).

(A) or (B).

(A), (B) or both (A) and (B).

The support of one the above can be subject to (an optional) UE capability.

In one example, a UE with 4 antenna ports and non-coherent antennas can report TPMI group(s) according to (A), (B) or both (A) and (B), where an example of the supported 4 antenna ports and non-coherent TPMI groups G0-G3 is shown in Table 12, and an example of the supported 2 antenna ports and non-coherent TPMI groups G0-G2 is shown in Table 11. The payload (number of bits) for this reporting can be as follows.

If UE reports (B), this reporting is via a 2-bit indication or via a parameter P1 which can take three values one for each of G0-G2.

If UE reports (A), this reporting is via a 2-bit indication or via a parameter P2 which can take four values one for each of G0-G3.

If UE reports (A) and (B), this reporting is via a 4-bit indication or via a parameter P=(P1,P2) where P1 can take three values one for each of G0-G2 (cf. Table 11), and P2 can take four values one for each of G0-G3 (cf. Table 12).

One of the above reporting (and payload) can be subject to (an optional) UE capability. For example, when the UE supports multiple SRS resources in a SRS set with usage set to 'Codebook' such that the number of SRS ports can be different across multiple SRS resources, and the UE can support a SRS resource with a maximum 4 SRS ports, then the UE can report both (A) and (B) via a 4-bit indication or via a parameter P=(P1,P2), as explained above. Otherwise, when the UE can only support the same number of SRS ports (in multiple SRS resources), then the UE can report (A) or (B) via a 2-bit indication or via a parameter P1 or P2, as explained above.

In one example, a UE with 4 antenna ports and non-coherent antennas can report two TPMI groups according both (A) and (B), i.e., the UE needs to report a TPMI group from 2-port non-coherent TPMI groups, and a TPMI group from 4-port non-coherent TPMI groups, where an example of the supported 4 antenna ports and non-coherent TPMI groups G0-G3 is shown in Table 12, and an example of the supported 2 antenna ports and non-coherent TPMI groups G0-G2 is shown in Table 11. The payload (number of bits) for this reporting can be as follows.

This reporting is via a 4-bit indication or via a parameter P=(P1,P2) where P1 can take three values one for each of G0-G2 (cf. Table 11), and P2 can take four values one for each of G0-G3 (cf. Table 12).

A UE with 4 antenna ports and partial-coherent antennas (i.e., PC UE with 4 antenna ports) can only report one of the following:

(A) a single TPMI group from the supported TPMI groups for 4 antenna ports and non-coherent TPMI groups
(B) a single TPMI group from the supported TPMI groups for 2 antenna ports and non-coherent TPMI groups.
(C) a single TPMI group from the supported TPMI groups for 4 antenna ports and non-/partial-coherent TPMI groups.
(A) and (B).
(A) or (B).
(A), (B) or both (A) and (B).
(A) and (C).
(A) or (C).
(A), (C) or both (A) and (C).
(C) and (B).
(C) or (B).
(C), (B) or both (C) and (B).
(A), (B) and (C).

The support of one the above can be subject to (an optional) UE capability.

In one example, a UE with 4 antenna ports and partial-coherent antennas can report TPMI group(s) according to (C), (B) or both (C) and (B), where an example of the supported 4 antenna ports and non-/partial-coherent TPMI groups G0-G6 is shown in Table 13, and an example of the supported 2 antenna ports and non-coherent TPMI groups G0-G2 is shown in Table 11. The payload (number of bits) for this reporting can be as follows.

If UE reports (B), this reporting is via a 2-bit indication or via a parameter P1 which can take three values one for each of G0-G2.

If UE reports (C), this reporting is via a 3-bit (or 4-bit) indication or via a parameter P2 which can take seven values one for each of G0-G6.

If UE reports (C) and (B), this reporting is via a 5-bit indication or via a parameter P=(P1,P2) where P1 can take three values one for each of G0-G2 (cf. Table 11), and P2 can take seven values one for each of G0-G3 (cf. Table 13).

One of the above reporting (and payload) can be subject to (an optional) UE capability. For example, when the UE supports multiple SRS resources in a SRS set with usage set to 'Codebook' such that the number of SRS ports can be different across multiple SRS resources, and the UE can support a SRS resource with a maximum 4 SRS ports, then the UE can report both (C) and (B) via a 5-bit indication or via a parameter P=(P1,P2), as explained above.

Otherwise, when the UE can only support the same number of SRS ports (in multiple SRS resources), then the UE can report (A) or (B) via a 2-bit (or 3-bit) indication or via a parameter P1 or P2, as explained above.

In one example, a UE with 4 antenna ports and partial-coherent antennas can report three TPMI groups according (A), (B), and (C), i.e., the UE needs to report a TPMI group from 2-port non-coherent TPMI groups, a TPMI group from 4-port non-coherent TPMI groups, and a TPMI group from 4-port partial-coherent TPMI groups, where an example of the supported 4 antenna ports and non-coherent TPMI groups G0-G3 is shown in Table 12, an example of the supported 2 antenna ports and non-coherent TPMI groups G0-G2 is shown in Table 11, and an example of the supported 4 antenna ports and partial-coherent TPMI groups G0-G6 is shown in Table 13. The payload (number of bits) for this reporting can be as follows.

This reporting is via a 7-bit indication or via a parameter P=(P1,P2,P3) where P1 can take three values one for each of G0-G2 (cf. Table 11), P2 can take four values one for each of G0-G3 (cf. Table 12) and P3 can take seven values one for each of G0-G6 (cf. Table 13).

In one example, a UE with 4 antenna ports and partial-coherent antennas can report three TPMI groups according (A), (B), and (C), i.e., the UE needs to report a TPMI group from 2-port non-coherent TPMI groups, a TPMI group from 4-port non-coherent TPMI groups, and a TPMI group from 4-port partial-coherent TPMI groups, where an example of the supported 4 antenna ports and non-coherent TPMI groups G0-G3 is shown in Table 12, an example of the supported 2 antenna ports and non-coherent TPMI groups G0-G2 is shown in Table 11, and an example of the supported 4 antenna ports and partial-coherent TPMI groups G4-G6 is shown in Table 13. The payload (number of bits) for this reporting can be as follows.

This reporting is via a 6-bit indication or via a parameter P=(P1,P2,P3) where P1 can take three values one for each of G0-G2 (cf. Table 11), P2 can take four values one for each of G0-G3 (cf. Table 12) and P3 can take three values one for each of G4-G6 (cf. Table 13).

In one example, a UE with 4 antenna ports and partial-coherent antennas can report TPMI group(s) according to (C), (B) or both (C) and (B), where an example of the supported 4 antenna ports and non-/partial-coherent TPMI groups G0-G6 is shown in Table 13, and an example of the supported 2 antenna ports and non-coherent TPMI groups G0-G2 is shown in Table 11. The payload (number of bits) for this reporting can be as follows.

If UE reports (B), this reporting is via a 2-bit indication or via a parameter P1 which can take three values one for each of G0-G2.

If UE reports (C), this reporting is via a 3-bit (or 4-bit) indication or via a parameter P2 which can take seven values one for each of G0-G6.

If UE reports (C) and (B), this reporting is via a 4-bit indication or via a parameter P such that P=P2 (above) or P=(g1,g2) where (g1,g2) can take a value from a set S of TPMI groups (g1,g2), where g1 belongs to Y and g2 belongs to Z. Here, the notation Y=4-port non-coherent TPMI groups (G0-G3) in Table 12 and Z=4-port non/partial-coherent TPMI groups (G0-G6) in Table 13. So, the total number of states for TPMI group reporting=7+x, where x is the size of the set S.

The set S is according to at least one of the following examples.
- S={(G1,G4), (G2,G4)}, where G1, G2, and G4 are as in Table 13.
- S={(G0,G4), (G0,G5), (G0,G6), (G1,G4), (G1,G5), (G1,G6), (G2,G4), (G2,G6)}, where G0-G6 are as in Table 13.
- S is a subset of {(G0,G4), (G0,G5), (G0,G6), (G1,G4), (G1,G5), (G1,G6), (G2,G4), (G2,G6)}, where G0-G6 are as in Table 13.

In one example, for a 4-port full coherent UE, the reporting is the same as 4-port partial coherent UE.

Throughout this disclosure, the TPMI group=the union of {Gi, Gj} can be interchangeably replaced with the pair (Gi, Gj), i.e., TPMI group=pair (Gi, Gj). This is applicable to all embodiments of this disclosure.

In embodiment 4, a UE reports a single TPMI group or multiple TPMI groups according to at least one of the following sub-embodiments.

In sub-embodiment 4.1, for a UE with 4 antenna ports, the UE shall report X, wherein
X=one or multiple of TPMI groups g1, g2 and g3, i.e., X=g1 or g2 or g3 or (g1, g2) or (g2, g3) or (g1, g3) or (g1, g2, g3), wherein
  g1 is a TPMI group from a set of TPMI groups (S1) for 2 antenna ports
  g2 is a TPMI group from a first set of TPMI groups (S2) for 4 antenna ports
  g3 is a TPMI group from a second set of TPMI groups (S3) for 4 antenna ports.

In one example, such reporting is only for the UE with partial-coherent antennas. In another example, such reporting is for the UE with either partial-coherent or full-coherent antennas. In another example, such reporting is regardless of the UE antenna coherence capability reporting.

In sub-embodiment 4.2, for a UE with 4 antenna ports, the UE shall report multiple TPMI groups (X, Y), wherein
X=g1 is a TPMI group from a set of TPMI groups (S1) for 2 antenna ports
Y=one or both of TPMI groups g2 and g3, i.e., Y=g2 or g3 or (g2, g3), wherein
  g2 is a TPMI group from a first set of TPMI groups (S2) for 4 antenna ports
  g3 is a TPMI group from a second set of TPMI groups (S3) for 4 antenna ports.

In one example, such reporting is only for the UE with partial-coherent antennas. In another example, such reporting is for the UE with either partial-coherent or full-coherent antennas. In another example, such reporting is regardless of the UE antenna coherence capability reporting.

In sub-embodiment 4.3, for a UE with 4 antenna ports, the UE shall report multiple TPMI groups (X, Y, Z), wherein
X=g1 is a TPMI group from a set of TPMI groups (S1) for 2 antenna ports
Y=g2 is a TPMI group from a first set of TPMI groups (S2) for 4 antenna ports
Z=g3 is a TPMI group from a second set of TPMI groups (S3) for 4 antenna ports.

In one example, such reporting is only for the UE with partial-coherent antennas. In another example, such reporting is for the UE with either partial-coherent or full-coherent antennas. In another example, such reporting is regardless of the UE antenna coherence capability reporting.

In sub-embodiment 4.4, for a UE with 4 antenna ports and non-coherent antennas, the UE shall report X, wherein
X=one or multiple of TPMI groups g1, g2 and g3, i.e., X=g1 or g2 or g3 or (g1, g2) or (g2, g3) or (g1, g3) or (g1, g2, g3), wherein
  g1 is a TPMI group from a set of TPMI groups (S1) for 2 antenna ports
  g2 is a TPMI group from a first set of TPMI groups (S2) for 4 antenna ports
  g3 is a TPMI group from a second set of TPMI groups (S3) for 4 antenna ports.

In sub-embodiment 4.5, for a UE with 4 antenna ports and non-coherent antennas, the UE shall report multiple TPMI groups (X, Y), wherein
X=g1 is a TPMI group from a set of TPMI groups (S1) for 2 antenna ports
Y=one or both of TPMI groups g2 and g3, i.e., Y=g2 or g3 or (g2, g3), wherein
  g2 is a TPMI group from a first set of TPMI groups (S2) for 4 antenna ports
  g3 is a TPMI group from a second set of TPMI groups (S3) for 4 antenna ports In sub-embodiment 4.6, for a UE with 4 antenna ports and non-coherent antennas, the UE shall report multiple TPMI groups (X, Y, Z), wherein
X=g1 is a TPMI group from a set of TPMI groups (S1) for 2 antenna ports
Y=g2 is a TPMI group from a first set of TPMI groups (S2) for 4 antenna ports
Z=g3 is a TPMI group from a second set of TPMI groups (S3) for 4 antenna ports.

In sub-embodiment 4.7, for a UE with 2 antenna ports antennas, the UE shall report a single TPMI group X, wherein
X=g1 is a TPMI group from a set of TPMI groups (S1) for 2 antenna ports.

In one example, such reporting is only for the UE with non-coherent antennas. In another example, such reporting is for the UE with either non-coherent or full-coherent antennas. In another example, such reporting is regardless of the UE antenna coherence capability reporting.

In one example, the set of TPMI groups (S1) in sub-embodiment 4-1 through 4-7 corresponds {G0, G1, G2} shown in Table 11, and the TPMI group g1 can be indicated via a 2-bit bitmap (associated with TPMI=0,1). In this case the bitmap value=00 can be used to indicate 'NULL' indicating that g1 is not reported.

In one example, the set of first TPMI groups S2 and S3 in sub-embodiment 4-4 through 4-6 correspond {G0, G1, G2} and {G3, G4, G5}, as shown in Table 26, wherein the TPMI groups are identical to ones in Table 15. The TPMI group g2 can be indicated via a 2-bit indication. In this case, one value (e.g., 0) can be used to indicate 'NULL' indicating that g2 is not reported. Likewise, the TPMI group g3 can be indicated via a 2-bit indication. In this case, one value (e.g., 0) can be used to indicate 'NULL' indicating that g3 is not reported. Alternatively, the TPMI groups g2 and g3 can be indicated jointly via a 4-bit indication. In this case, one value (e.g., 0) can be used to indicate 'NULL' indicating that g2 and g3 are not reported.

In one example, the set of first TPMI groups S2 and S3 in sub-embodiment 4-4 through 4-6 correspond {G0, G1, G2, G3} and {G4, G5}, as shown in Table 26. In one example, the set of first TPMI groups S2 and S3 in sub-embodiment 4-4 through 4-6 correspond {G0, G1, G2} and {G3, G4, G5, G6}, as shown in Table 27.

TABLE 26

| TPMI groups | | TPMI pre-coder/pre-coding matrices |
|---|---|---|
| First set S1 | G0 | $\frac{1}{2}\begin{bmatrix}1\\0\\0\\0\end{bmatrix}$ |
| | G1 | $\left\{\frac{1}{2}\begin{bmatrix}1\\0\\0\\0\end{bmatrix}, \frac{1}{2}\begin{bmatrix}0\\0\\1\\0\end{bmatrix}\right\}\left\{\frac{1}{2}\begin{bmatrix}1&0\\0&0\\0&1\\0&0\end{bmatrix}\right\}$ |
| | G2 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}; \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}; \frac{1}{2}\begin{bmatrix}1&0&0\\0&1&0\\0&0&1\\0&0&0\end{bmatrix}$ |
| Second set S2 | G3 | $\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}; \frac{1}{2}\begin{bmatrix}1&0&0\\0&1&0\\0&0&1\\0&0&0\end{bmatrix}$ |
| | G4 | $\frac{1}{2}\begin{bmatrix}1&0\\0&0\\0&1\\0&0\end{bmatrix}$ |
| | G5 | $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&0\\0&1\end{bmatrix}, \frac{1}{2}\begin{bmatrix}0&0\\0&0\\1&0\\0&1\end{bmatrix}\right\};$ $\frac{1}{2}\begin{bmatrix}1&0&0\\0&1&0\\0&0&1\\0&0&0\end{bmatrix}$ |

In one example, the set of first TPMI groups S2 and S3 in sub-embodiment 4-1 through 4-3 correspond {G0, G1, G2} and {G3, G4, G5, G6}, as shown in Table 27, wherein the TPMI groups are identical to ones in Table 13. The TPMI group g2 can be indicated via a 2-bit indication. In this case, one value (e.g., 0) can be used to indicate 'NULL' indicating that g2 is not reported. Likewise, the TPMI group g3 can be indicated via a 2-bit indication. In this case, one value (e.g., 0) can be used to indicate 'NULL' indicating that g3 is not reported. Alternatively, the TPMI groups g2 and g3 can be indicated jointly via a 4-bit indication. In this case, one value (e.g., 0) can be used to indicate 'NULL' indicating that g2 and g3 are not reported.

In one example, the set of first TPMI groups S2 and S3 in sub-embodiment 4-1 through 4-3 correspond {G0, G1, G2} and {G4, G5, G6}, as shown in Table 26. In one example, the set of first TPMI groups S2 and S3 in sub-embodiment 4-1 through 4-3 correspond {G0, G1, G2, G3} and {G4, G5, G6}, as shown in Table 27.

TABLE 27

| TPMI groups | | TPMI pre-coder/pre-coding matrices |
|---|---|---|
| First set S1 | G0 | $\frac{1}{2}\begin{bmatrix}1\\0\\0\\0\end{bmatrix}$ |
| | G1 | $\left\{\frac{1}{2}\begin{bmatrix}1\\0\\0\\0\end{bmatrix}, \frac{1}{2}\begin{bmatrix}0\\0\\1\\0\end{bmatrix}\right\}\left\{\frac{1}{2}\begin{bmatrix}1&0\\0&0\\0&1\\0&0\end{bmatrix}\right\}$ |
| | G2 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}; \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}; \frac{1}{2}\begin{bmatrix}1&0&0\\0&1&0\\0&0&1\\0&0&0\end{bmatrix}$ |

TABLE 27-continued

| TPMI groups | | TPMI pre-coder/pre-coding matrices |
|---|---|---|
| Second set S2 | G3 | $\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}; \frac{1}{2}\begin{bmatrix}1&0&0\\0&1&0\\0&0&1\\0&0&0\end{bmatrix}$ |
| | G4 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}; \frac{1}{2}\begin{bmatrix}1&0\\0&0\\0&1\\0&0\end{bmatrix}$ |
| | G5 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\};$ $\frac{1}{2}\begin{bmatrix}1&0&0\\0&1&0\\0&0&1\\0&0&0\end{bmatrix}$ |
| | G6 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\};$ $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\};$ $\frac{1}{2}\begin{bmatrix}1&0&0\\0&1&0\\0&0&1\\0&0&0\end{bmatrix}$ |

Any of the above variation embodiments can be utilized independently or in combination with at least one other variation embodiment.

Figure 12:
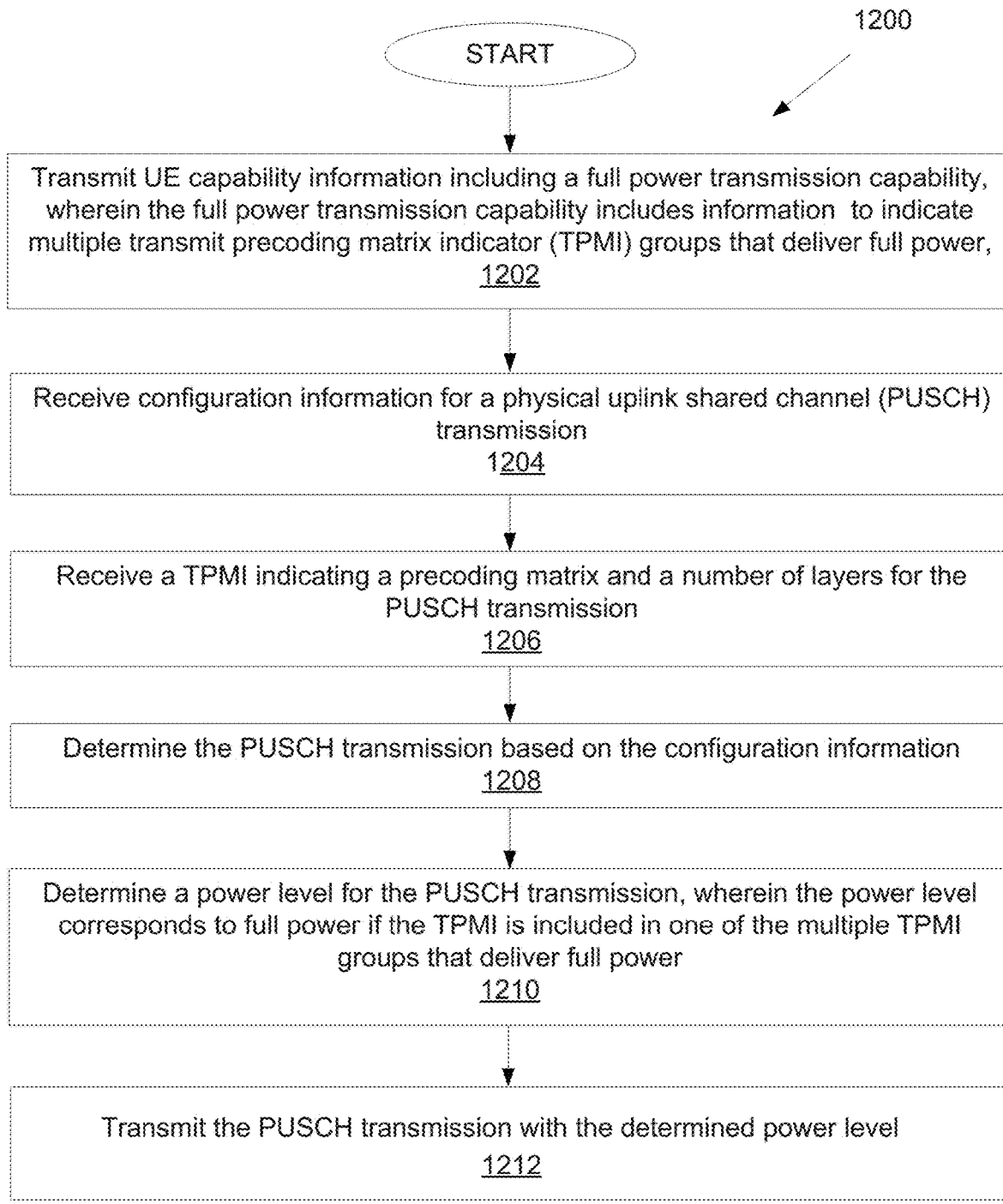
FIG. 12 illustrates a flow chart of a method for operating a UE according to embodiments of the present disclosure.

FIG. 12 illustrates a flow chart of a method 1200 for operating a user equipment (UE), as may be performed by a UE such as UE 116, according to embodiments of the present disclosure. The embodiment of the method 1200 illustrated in FIG. 12 is for illustration only. FIG. 12 does not limit the scope of this disclosure to any particular implementation.

As illustrated in FIG. 12, the method 1200 begins at step 1202. In step 1202, the UE (e.g., 111-116 as illustrated in FIG. 1) transmits UE capability information including a full power transmission capability, wherein the full power transmission capability includes information (I) to indicate multiple transmit precoding matrix indicator (TPMI) groups that deliver full power.

In step 1204, the UE receives configuration information for a physical uplink shared channel (PUSCH) transmission.

In step 1206, the UE receives a TPMI indicating a precoding matrix and a number of layers for the PUSCH transmission.

In step 1208, the UE determines the PUSCH transmission based on the configuration information.

In step 1210, the UE determines a power level for the PUSCH transmission, wherein the power level corresponds to full power if the TPMI is included in one of the multiple TPMI groups that deliver full power.

In step 1212, the UE transmits the PUSCH transmission with the determined power level.

In one embodiment, the UE capability information further includes coherence capability of antenna ports at the UE, and the coherence capability is one of non-coherent, partial-coherent, or full-coherent.

In one embodiment, when the UE has 4 antenna ports and the coherence capability corresponds to non-coherent, the information (I) indicates one or more of: a TPMI group for 4 antenna ports and comprising non-coherent TPMIs; and a TPMI group for 2 antenna ports and comprising non-coherent TPMIs.

In one embodiment, the TPMI group for 4 antenna ports and comprising non-coherent TPMIs is one of the TPMI groups G0 . . . G3 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |

-continued

| TPMI group | TPMI pre-coder/pre-coding matrices |
|---|---|
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\0&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ | and the TPMI group for 2 antenna ports and comprising non-coherent TPMIs is indicated via a 2-bit bitmap $b_0 b_1$, where bits $b_0$ and $b_1$ correspond to TPMIs $$\frac{1}{\sqrt{2}}\begin{bmatrix}1\\0\end{bmatrix} \text{ and } \frac{1}{\sqrt{2}}\begin{bmatrix}0\\1\end{bmatrix},$$

respectively.

In one embodiment, when the UE has 4 antenna ports and the coherence capability corresponds to partial-coherent, the information (I) indicates one or more of: a TPMI group for 4 antenna ports and comprising non-coherent TPMIs; a TPMI group 2 antenna ports and comprising non-coherent TPMIs; and a TPMI group for 4 antenna ports and comprising partial-coherent TPMIs.

In one embodiment, the TPMI group for 4 antenna ports and comprising non-coherent TPMI is one of the TPMI groups G0 . . . G3 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\0&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ | the TPMI group for 2 antenna ports and comprising non-coherent TPMIs is indicated via a 2-bit bitmap $b_0 b_1$, where bits $b_0$ and $b_1$ correspond to TPMIs $$\frac{1}{\sqrt{2}}\begin{bmatrix}1\\0\end{bmatrix} \text{ and } \frac{1}{\sqrt{2}}\begin{bmatrix}0\\1\end{bmatrix},$$

respectively, and the TPMI group for 4 antenna ports and comprising partial-coherent TPMIs is one of the TPMI groups G0 . . . G6 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\0&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G4 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}$ |
| G5 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}$ |
| G6 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}$, $\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\1&0\\0&0\\0&1\end{bmatrix}, \frac{1}{2}\begin{bmatrix}0&0\\0&0\\1&0\\0&1\end{bmatrix}, \frac{1}{2}\begin{bmatrix}1&0&0\\0&1&0\\0&0&1\\0&0&0\end{bmatrix}$. |

In one embodiment, when the UE has 4 antenna ports and the coherence capability corresponds to full-coherent, the information (I) indicates one or more of: a TPMI group for 4 antenna ports and comprising non-coherent TPMIs; a TPMI group for 2 antenna ports and comprising non-coherent TPMIs; and a TPMI group for 4 antenna ports and comprising partial-coherent TPMIs.

In one embodiment, the TPMI group for 4 antenna ports and comprising non-coherent TPMIs is one of the TPMI groups G0 . . . G3 given by

| TPMI group | TPMI pre-coder/pre-coding matrices |
|---|---|
| G0 | $\frac{1}{2}\begin{bmatrix}1\\0\\0\\0\end{bmatrix}$ |

| TPMI group | TPMI pre-coder/pre-coding matrices |
|---|---|
| G1 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ | the TPMI group for 2 antenna ports and comprising non-coherent TPMIs is indicated via a 2-bit bitmap $b_0b_1$, where bits $b_0$ and $b_1$ correspond to TPMIs $$\frac{1}{\sqrt{2}}\begin{bmatrix}1\\0\end{bmatrix} \text{ and } \frac{1}{\sqrt{2}}\begin{bmatrix}0\\1\end{bmatrix},$$

respectively, and the TPMI group for 4 antenna ports and comprising partial-coherent TPMI groups is one of the TPMI groups G0 . . . G6 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G4 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&1\\0&0\\0&0\end{bmatrix}$ |
| G5 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&1\\0&0\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G6 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}, \frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}, \frac{1}{2}\begin{bmatrix}1&0&0\\0&1&0\\0&0&1\\0&0&0\end{bmatrix}.$ |

Figure 13:
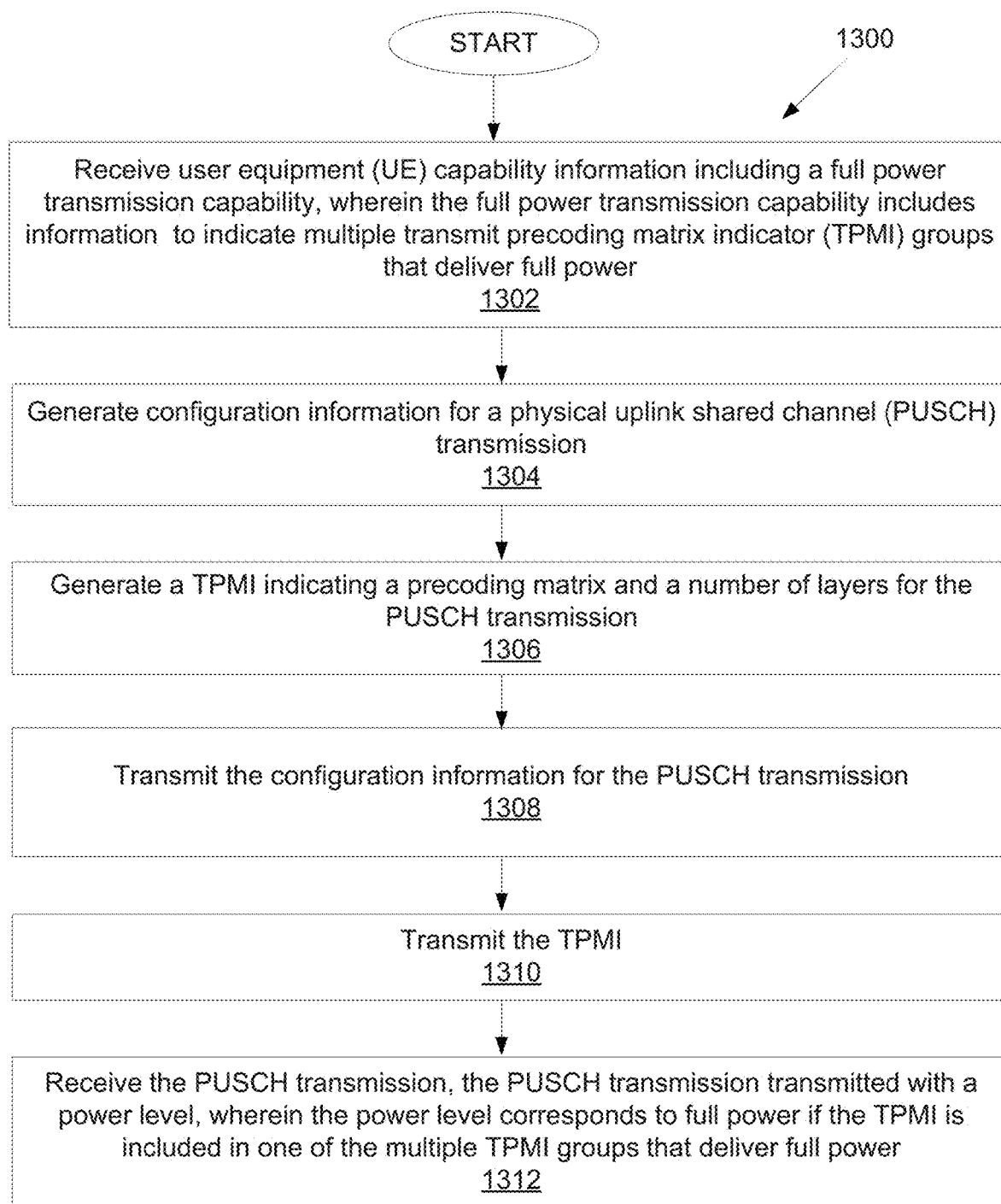
FIG. 13 illustrates a flow chart of a method for operating a BS according to embodiments of the present disclosure.

FIG. 13 illustrates a flow chart of another method 1300, as may be performed by a base station (BS) such as BS 102, according to embodiments of the present disclosure. The embodiment of the method 1300 illustrated in FIG. 13 is for illustration only. FIG. 13 does not limit the scope of this disclosure to any particular implementation.

As illustrated in FIG. 13, the method 1300 begins at step 1302. In step 1302, the BS (e.g., 101-103 as illustrated in FIG. 1), receives user equipment (UE) capability information including a full power transmission capability, wherein the full power transmission capability includes information (I) to indicate multiple transmit precoding matrix indicator (TPMI) groups that deliver full power.

In step 1304, the BS generates configuration information for a physical uplink shared channel (PUSCH) transmission.

In step 1306, the BS generates a TPMI indicating a precoding matrix and a number of layers for the PUSCH transmission.

In step 1308, the BS transmits the configuration information for the PUSCH transmission.

In step 1310, the BS transmits the TPMI.

In step 1312, the BS receives the PUSCH transmission, the PUSCH transmission transmitted with a power level, wherein the power level corresponds to full power if the TPMI is included in one of the multiple TPMI groups that deliver full power.

In one embodiment, the UE capability information further includes coherence capability of antenna ports at a UE, and the coherence capability is one of non-coherent, partial-coherent, or full-coherent.

In one embodiment, when the UE has 4 antenna ports and the coherence capability corresponds to non-coherent, the information (I) indicates one or more of: a TPMI group for 4 antenna ports and comprising non-coherent TPMIs; and a TPMI group for 2 antenna ports and comprising non-coherent TPMIs.

In one embodiment, the TPMI group for 4 antenna ports and comprising non-coherent TPMIs is one of the TPMI groups G0 . . . G3 given by

| TPMI group | TPMI pre-coder/pre-coding matrices |
|---|---|
| G0 | $\frac{1}{2}\begin{bmatrix}1\\0\\0\\0\end{bmatrix}$ |

-continued

| TPMI group | TPMI pre-coder/pre-coding matrices |
|---|---|
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ | and the TPMI group for 2 antenna ports and comprising non-coherent TPMIs is indicated via a 2-bit bitmap $b_0 b_1$, where bits $b_0$ and $b_1$ correspond to TPMIs $$\frac{1}{\sqrt{2}}\begin{bmatrix}1\\0\end{bmatrix} \text{ and } \frac{1}{\sqrt{2}}\begin{bmatrix}0\\1\end{bmatrix},$$

respectively.

In one embodiment, when the UE has 4 antenna ports and the coherence capability corresponds to partial-coherent, the information (I) indicates one or more of: a TPMI group for 4 antenna ports and comprising non-coherent TPMIs; a TPMI group 2 antenna ports and comprising non-coherent TPMIs; and a TPMI group for 4 antenna ports and comprising partial-coherent TPMIs.

In one embodiment, the TPMI group for 4 antenna ports and comprising non-coherent TPMI is one of the TPMI groups G0 . . . G3 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix},$ | the TPMI group for 2 antenna ports and comprising non-coherent TPMIs is indicated via a 2-bit bitmap $b_0 b_1$, where bits $b_0$ and $b_1$ correspond to TPMIs $$\frac{1}{\sqrt{2}}\begin{bmatrix}1\\0\end{bmatrix} \text{ and } \frac{1}{\sqrt{2}}\begin{bmatrix}0\\1\end{bmatrix},$$

respectively, and the TPMI group for 4 antenna ports and comprising partial-coherent TPMIs is one of the TPMI groups G0 . . . G6 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix},$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G4 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}$ |
| G5 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix},$ |
| | $\frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G6 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix},$ |
| | $\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix},$ |
| | $\frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}, \frac{1}{2}\begin{bmatrix}1&0&0\\0&1&0\\0&0&1\\0&0&0\end{bmatrix}.$ |

In one embodiment, when the UE has 4 antenna ports and the coherence capability corresponds to full-coherent, the information (I) indicates one or more of: a TPMI group for 4 antenna ports and comprising non-coherent TPMIs; a TPMI group for 2 antenna ports and comprising non-coherent TPMIs; and a TPMI group for 4 antenna ports and comprising partial-coherent TPMIs.

In one embodiment, the TPMI group for 4 antenna ports and comprising non-coherent TPMIs is one of the TPMI groups G0 . . . G3 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\1\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix},$ $\frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ | the TPMI group for 2 antenna ports and comprising non-coherent TPMIs is indicated via a 2-bit bitmap $b_0 b_1$, where bits $b_0$ and $b_1$ correspond to TPMIs $$\frac{1}{\sqrt{2}}\begin{bmatrix}1\\0\end{bmatrix} \text{ and } \frac{1}{\sqrt{2}}\begin{bmatrix}0\\1\end{bmatrix},$$

respectively, and the TPMI group for 4 antenna ports and comprising partial-coherent TPMI groups is one of the TPMI groups G0 . . . G6 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\1\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix},$ $\frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G4 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}$ |
| G5 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix},$ $\frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G6 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix},$ $\frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix},$ $\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix},$ $\frac{1}{2}\begin{bmatrix}0&0\\1&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0&0\\0&1&0\\0&0&1\\0&0&0\end{bmatrix}.$ |

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:
1. A user equipment (UE) in a wireless communication system, the UE comprising:
 a transceiver configured to:
  transmit, to a base station, UE capability information including first information to indicate whether the UE supports full power uplink (UL) transmission for codebook-based UL transmission and second infor- mation to indicate at least one transmit precoding matrix indicator (TPMI) group that delivers full power; and receive, from the base station, downlink control information (DCI);

a memory; and a processor operably coupled with the transceiver and the memory, the processor configured to:

identify a TPMI for a physical uplink shared channel (PUSCH) transmission based on the DCI; and determine a power level for the PUSCH transmission based on the TPMI for the PUSCH transmission, wherein the transceiver is further configured to transmit the PUSCH transmission with the determined power level.

2. The UE of claim 1, wherein, in case that the UE has 2 antenna ports, the second information indicates a TPMI group for 2 antenna ports and comprises one or more non-coherent TPMIs.

3. The UE of claim 1, wherein, in case that the UE has 4 antenna ports and a coherence capability of the UE corresponds to non-coherent, the second information indicates one or more of:

a TPMI group for 4 antenna ports and comprising one or more non-coherent TPMIs; and a TPMI group for 2 antenna ports and comprising one or more non-coherent TPMIs.

4. The UE of claim 3, wherein the TPMI group for 4 antenna ports and comprising non-coherent TPMIs is one of TPMI groups G0 . . . G3 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix},$ $\frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ | and the TPMI group for 2 antenna ports and comprising non-coherent TPMIs is indicated via a 2-bit bitmap $b_0b_1$, where bits $b_0$ and $b_1$ correspond to TPMIs $$\frac{1}{\sqrt{2}}\begin{bmatrix}1\\0\end{bmatrix} \text{ and } \frac{1}{\sqrt{2}}\begin{bmatrix}0\\1\end{bmatrix},$$

respectively.

5. The UE of claim 1, wherein when the UE has 4 antenna ports and a coherence capability of the UE corresponds to partial-coherent, the second information indicates one or more of:

a TPMI group for 4 antenna ports and comprising one or more non-coherent TPMIs;

a TPMI group 2 antenna ports and comprising one or more non-coherent TPMIs; and a TPMI group for 4 antenna ports and comprising one or more partial-coherent TPMIs.

6. The UE of claim 5, wherein:

the TPMI group for 4 antenna ports and comprising non-coherent TPMI is one of TPMI groups G0 . . . G3 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix},$ $\frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ | the TPMI group for 2 antenna ports and comprising non-coherent TPMIs is indicated via a 2-bit bitmap $b_0b_1$, where bits $b_0$ and $b_1$ correspond to TPMIs $$\frac{1}{\sqrt{2}}\begin{bmatrix}1\\0\end{bmatrix} \text{ and } \frac{1}{\sqrt{2}}\begin{bmatrix}0\\1\end{bmatrix},$$

respectively, and the TPMI group for 4 antenna ports and comprising partial-coherent TPMIs is one of TPMI groups G0 . . . G6 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |

| TPMI group | TPMI pre-coder/pre-coding matrices |
|---|---|
| -continued | |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix},$ $\frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G4 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}$ |
| G5 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix},$ $\frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G6 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix},$ $\frac{1}{2}\begin{bmatrix}0\\1\\0\\j\end{bmatrix}, \frac{1}{2}\begin{bmatrix}0\\1\\0\\-j\end{bmatrix}, \frac{1}{2}\begin{bmatrix}0\\1\\0\\-j\end{bmatrix},$ $\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix},$ $\frac{1}{2}\begin{bmatrix}0&0\\1&0\\0&1\\0&0\end{bmatrix}, \frac{1}{2}\begin{bmatrix}0&0\\1&0\\1&0\\0&1\end{bmatrix}, \frac{1}{2}\begin{bmatrix}1&0&0\\0&1&0\\0&0&1\\0&0&0\end{bmatrix}$ |

7. The UE of claim 1, wherein when the UE has 4 antenna ports and a coherence capability corresponds to full-coherent, the second information indicates one or more of:
- a TPMI group for 4 antenna ports and comprising one or more non-coherent TPMIs;
- a TPMI group for 2 antenna ports and comprising one or more non-coherent TPMIs; and
- a TPMI group for 4 antenna ports and comprising one or more partial-coherent TPMIs.

8. The UE of claim 7, wherein:
the TPMI group for 4 antenna ports and comprising non-coherent TPMIs is one of TPMI groups G0 ... G3 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix},$ $\frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ | the TPMI group for 2 antenna ports and comprising non-coherent TPMIs is indicated via a 2-bit bitmap $b_0 b_1$, where bits $b_0$ and $b_1$ correspond to TPMIs $$\frac{1}{\sqrt{2}}\begin{bmatrix}1\\0\end{bmatrix} \text{ and } \frac{1}{\sqrt{2}}\begin{bmatrix}0\\1\end{bmatrix},$$

respectively, and
the TPMI group for 4 antenna ports and comprising partial-coherent TPMI groups is one of TPMI groups G0 ... G6 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix},$ $\frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |

-continued

| TPMI group | TPMI pre-coder/pre-coding matrices |
|---|---|
| G4 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}$ |
| G5 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix},$ $\frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0\\0&1\\0&0\\0&0\end{bmatrix}$ |
| G6 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix},$ $\frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}$ $\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix},$ $\frac{1}{2}\begin{bmatrix}0&0\\1&0\\0&1\\0&0\end{bmatrix}, \frac{1}{2}\begin{bmatrix}0&0\\1&0\\1&0\\0&1\end{bmatrix}, \frac{1}{2}\begin{bmatrix}1&0&0\\0&1&0\\0&0&1\\0&0&0\end{bmatrix}$ |

9. A base station (BS) comprising:
a transceiver;
a memory; and
a processor operably coupled with the transceiver and the memory,
wherein the transceiver is configured to:
receive, from user equipment (UE), UE capability information including first information to indicate whether the UE supports full power uplink (UL) transmission for codebook-based UL transmission and second information to indicate at least one transmit precoding matrix indicator (TPMI) group that delivers full power;
transmit, to the UE, downlink control information (DCI) including a TPMI for a physical uplink shared channel (PUSCH) transmission; and
receive, from the UE, the PUSCH transmission, the PUSCH transmission transmitted with a power level,
wherein the power level corresponds to the full power in case that a TPMI for the PUSCH transmission is included in the at least one TPMI group indicated by the second information.

10. The BS of claim 9, wherein, in case that the UE has 2 antenna ports, the second information indicates a TPMI group for 2 antenna ports and comprises one or more non-coherent TPMIs.

11. The BS of claim 10, wherein, in case that the UE has 4 antenna ports and a coherence capability of the UE corresponds to non-coherent, the second information indicates one or more of:
a TPMI group for 4 antenna ports and comprising one or more non-coherent TPMIs; and
a TPMI group for 2 antenna ports and comprising one or more non-coherent TPMIs.

12. The BS of claim 11, wherein the TPMI group for 4 antenna ports and comprising non-coherent TPMIs is one of TPMI groups G0 . . . G3 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix},$ $\frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ | and
the TPMI group for 2 antenna ports and comprising non-coherent TPMIs is indicated via a 2-bit bitmap $b_0b_1$, where bits $b_0$ and $b_1$ correspond to TPMIs $$\frac{1}{\sqrt{2}}\begin{bmatrix}1\\0\end{bmatrix} \text{ and } \frac{1}{\sqrt{2}}\begin{bmatrix}0\\1\end{bmatrix},$$

respectively.

13. The BS of claim 10, wherein, in case that the UE has 4 antenna ports and a coherence capability of the UE corresponds to partial-coherent, the second information indicates one or more of:
a TPMI group for 4 antenna ports and comprising one or more non-coherent TPMIs;
a TPMI group 2 antenna ports and comprising one or more non-coherent TPMIs; and
a TPMI group for 4 antenna ports and comprising one or more partial-coherent TPMIs.

14. The BS of claim 13, wherein:
the TPMI group for 4 antenna ports and comprising non-coherent TPMI is one of TPMI groups G0 . . . G3 given by

| TPMI group | TPMI pre-coder/pre-coding matrices |
|---|---|
| G0 | $\frac{1}{2}\begin{bmatrix}1\\0\\0\\0\end{bmatrix}$ |

| TPMI group | TPMI pre-coder/pre-coding matrices |
|---|---|
| G1 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix},$ $\frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ | the TPMI group for 2 antenna ports and comprising non-coherent TPMIs is indicated via a 2-bit bitmap $b_0 b_1$, where bits $b_0$ and $b_1$ correspond to TPMIs $$\frac{1}{\sqrt{2}}\begin{bmatrix}1\\0\end{bmatrix} \text{ and } \frac{1}{\sqrt{2}}\begin{bmatrix}0\\1\end{bmatrix},$$

respectively, and the TPMI group for 4 antenna ports and comprising partial-coherent TPMIs is one of TPMI groups G0 ... G6 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G4 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&1\\0&0\\0&0\end{bmatrix}$ |
| G5 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&1\\0&0\\0&0\end{bmatrix},$ |
| | $\frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G6 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix},$ |
| | $\frac{1}{2}\begin{bmatrix}0\\1\\0\\j\end{bmatrix}, \frac{1}{2}\begin{bmatrix}0\\1\\0\\-j\end{bmatrix}$ |
| | $\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix},$ |
| | $\frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}, \frac{1}{2}\begin{bmatrix}1&0&0\\0&1&0\\0&0&1\\0&0&0\end{bmatrix}$ |

15. The BS of claim 10, wherein when the UE has 4 antenna ports and a coherence capability corresponds to full-coherent, the second information indicates one or more of:
  a TPMI group for 4 antenna ports and comprising one or more non-coherent TPMIs;
  a TPMI group for 2 antenna ports and comprising one or more non-coherent TPMIs; and
  a TPMI group for 4 antenna ports and comprising one or more partial-coherent TPMIs.

16. The BS of claim 15, wherein:
  the TPMI group for 4 antenna ports and comprising non-coherent TPMIs is one of TPMI groups G0 ... G3 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix},$ |
| | $\frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ | the TPMI group for 2 antenna ports and comprising non-coherent TPMIs is indicated via a 2-bit bitmap $b_0b_1$, where bits $b_0$ and $b_1$ correspond to TPMIs $$\frac{1}{\sqrt{2}}\begin{bmatrix}1\\0\end{bmatrix} \text{ and } \frac{1}{\sqrt{2}}\begin{bmatrix}0\\1\end{bmatrix},$$

respectively, and the TPMI group for 4 antenna ports and comprising partial-coherent TPMI groups is one of TPMI groups G0 . . . G6 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix},$ $\frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G4 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}$ |
| G5 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix},$ $\frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G6 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix},$ $\frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix},$ $\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix},$ |

| TPMI group | TPMI pre-coder/pre-coding matrices |
|---|---|
| | $\frac{1}{2}\begin{bmatrix}0&0\\0&0\\1&0\\0&1\end{bmatrix}, \frac{1}{2}\begin{bmatrix}1&0&0\\0&1&0\\0&0&1\\0&0&0\end{bmatrix}.$ |

17. A method for operating a user equipment (UE), the method comprising:
transmitting, to a base station, UE capability information including first information to indicate whether the UE supports full power uplink (UL) transmission for codebook-based UL transmission and second information to indicate at least one transmit precoding matrix indicator (TPMI) group that delivers full power;
receiving, from the base station, downlink control information (DCI);
identifying a TPMI for a physical uplink shared channel (PUSCH) transmission based on the DCI;
determining a power level for the PUSCH transmission to correspond to the full power based on the TPMI for the PUSCH transmission; and
transmitting the PUSCH transmission with the determined power level.

18. The method of claim 17, wherein when the UE has 2 antenna ports, the second information indicates a TPMI group for 2 antenna ports and comprises one or more non-coherent TPMIs.

19. The method of claim 17, wherein when the UE has 4 antenna ports and a coherence capability of the UE corresponds to non-coherent, the second information indicates one or more of:
a TPMI group for 4 antenna ports and comprising one or more non-coherent TPMIs; and
a TPMI group for 2 antenna ports and comprising one or more non-coherent TPMIs.

20. The method of claim 19, wherein the TPMI group for 4 antenna ports and comprising non-coherent TPMIs is one of TPMI groups G0 . . . G3 given by

| TPMI group | TPMI pre-coder/pre-coding matrices |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix},$ $\frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ | and
the TPMI group for 2 antenna ports and comprising non-coherent TPMIs is indicated via a 2-bit bitmap $b_0b_1$, where bits $b_0$ and $b_1$ correspond to TPMIs $$\frac{1}{\sqrt{2}}\begin{bmatrix}1\\0\end{bmatrix} \text{ and } \frac{1}{\sqrt{2}}\begin{bmatrix}0\\1\end{bmatrix},$$

respectively.

* * * * *